US011729488B2

(12) United States Patent
Ouchi

(10) Patent No.: US 11,729,488 B2
(45) Date of Patent: Aug. 15, 2023

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Kenji Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/876,988

(22) Filed: Jul. 29, 2022

(65) Prior Publication Data

US 2022/0368825 A1    Nov. 17, 2022

Related U.S. Application Data

(63) Continuation of application No. 16/902,602, filed on Jun. 16, 2020, now Pat. No. 11,451,704, which is a
(Continued)

(30) Foreign Application Priority Data

Dec. 18, 2017 (JP) .................................. 2017-242228
Dec. 28, 2017 (JP) .................................. 2017-254402

(51) Int. Cl.
*H04N 23/61* (2023.01)
*H04N 23/60* (2023.01)
(Continued)

(52) U.S. Cl.
CPC .............. *H04N 23/61* (2023.01); *G06N 3/08* (2013.01); *G06V 10/10* (2022.01); *H04N 23/64* (2023.01);
(Continued)

(58) Field of Classification Search
CPC ........... H04N 5/23218; H04N 5/23222; H04N 5/232411; H04N 5/23299; H04N 5/232;
(Continued)

(56) References Cited

U.S. PATENT DOCUMENTS

2004/0027466 A1* 2/2004 Mizobuchi ............ G06F 1/3215
386/E5.072
2006/0137198 A1    6/2006 Cato
(Continued)

FOREIGN PATENT DOCUMENTS

CN    104349051 A    2/2015
CN    106375656 A    2/2017
(Continued)

OTHER PUBLICATIONS

Notice of Reasons for Refusal issued by the Japan Patent Office dated Aug. 12, 2022 in corresponding JP Patent Application No. 2017-254402, with English translation.
(Continued)

*Primary Examiner* — Ahmed A Berhan
(74) *Attorney, Agent, or Firm* — Carter, DeLuca & Farrell LLP

(57) ABSTRACT

The present invention eliminates meaningless searching for an object, and increases the probability that an image the user likes can be obtained. An image capturing apparatus comprises an image capturing device configured to capture an object image, an object detection unit configured to detect an object from image data captured by the image capturing device, a state detection unit configured to detect information pertaining to a state in which the image capturing apparatus is being held, and a control unit configured to control a range in which the object detection unit searches for an object, on the basis of state information of the image capturing apparatus detected by the state detection unit.

23 Claims, 18 Drawing Sheets

Related U.S. Application Data continuation of application No. PCT/JP2018/044548, filed on Dec. 4, 2018.

(51) Int. Cl.
*H04N 23/65* (2023.01)
*H04N 23/695* (2023.01)
*G06V 10/10* (2022.01)
*G06N 3/08* (2023.01)

(52) U.S. Cl.
CPC ......... *H04N 23/651* (2023.01); *H04N 23/695* (2023.01)

(58) Field of Classification Search
CPC ........... H04N 5/23241; H04N 5/23258; H04N 5/23296; H04N 23/61; H04N 23/64; H04N 23/651; H04N 23/695; G06N 3/08; G06N 3/084; G06V 10/10; G03B 15/00; G03B 17/56; G03B 17/561
See application file for complete search history.

(56) References Cited

U.S. PATENT DOCUMENTS

| | | | | |
|---|---|---|---|---|
| 2007/0211161 | A1* | 9/2007 | Okamoto | H04N 5/23219 348/333.12 |
| 2011/0113031 | A1* | 5/2011 | Oliver | G06F 16/24556 707/737 |
| 2011/0187815 | A1 | 8/2011 | Asami et al. | |
| 2011/0228980 | A1 | 9/2011 | Ichikawa et al. | |
| 2012/0242844 | A1 | 9/2012 | Walker et al. | |
| 2014/0214271 | A1* | 7/2014 | Choi | B60W 30/095 701/36 |
| 2016/0057445 | A1 | 2/2016 | Tsubaki | |
| 2016/0191810 | A1* | 6/2016 | Tsubusaki | H04N 5/232945 348/240.1 |
| 2017/0026580 | A1 | 1/2017 | Gyotoku | |
| 2017/0134643 | A1* | 5/2017 | Kim | G06V 40/19 |
| 2017/0155831 | A1 | 6/2017 | Jang et al. | |

FOREIGN PATENT DOCUMENTS

| | | |
|---|---|---|
| CN | 107231530 A | 10/2017 |
| JP | 2004513541 A | 4/2004 |
| JP | 2007259423 A | 10/2007 |
| JP | 2007288444 A | 11/2007 |
| JP | 2008242207 A | 10/2008 |
| JP | 2011101155 A | 5/2011 |
| JP | 5453953 B2 | 3/2014 |
| JP | 2016046772 A | 4/2016 |
| JP | 2016536868 A | 11/2016 |
| JP | 2017028511 A | 2/2017 |
| KR | 20160076736 A | 7/2016 |
| WO | 2011043006 A1 | 4/2011 |
| WO | 2015055655 A1 | 4/2015 |
| WO | 2017122523 A1 | 7/2017 |

OTHER PUBLICATIONS

International Search Report and Written Opinion issued by the Japan Patent Office dated Jan. 22, 2019 in corresponding International Application No. PCT/JP2018/044548, with English translation of Search Report.
Extended European Search Report issued by the European Patent Office dated Jul. 13, 2021 in corresponding EP Patent Application No. 18893142.2.
Notification of the First Office Action issued by the China National Intellectual Property Administration dated Mar. 31, 2021 in corresponding CN Patent Application No. 201880081863.2, with English translation.

* cited by examiner

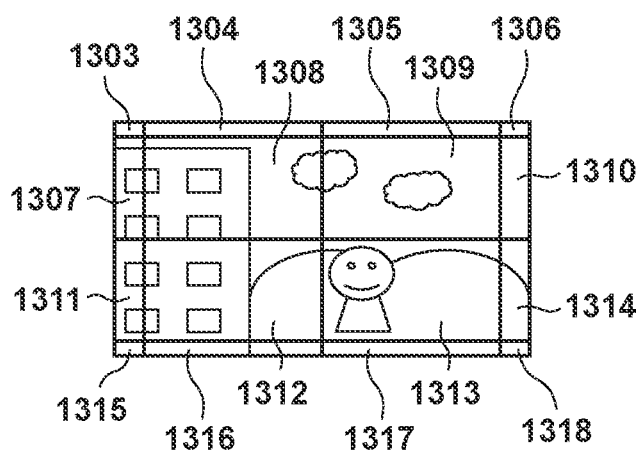
F I G. 10D
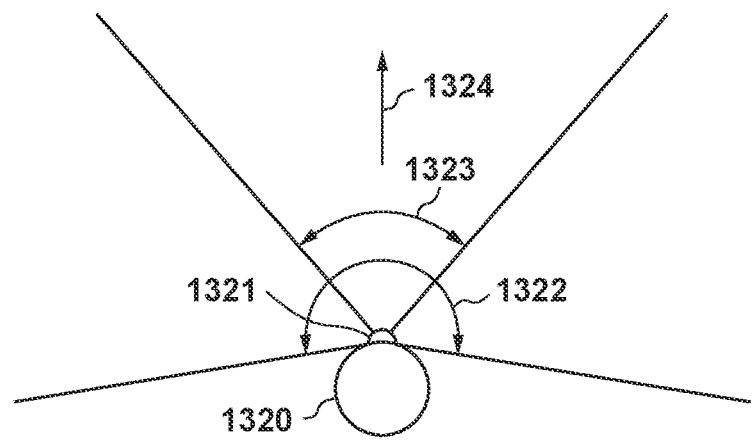
F I G. 10E

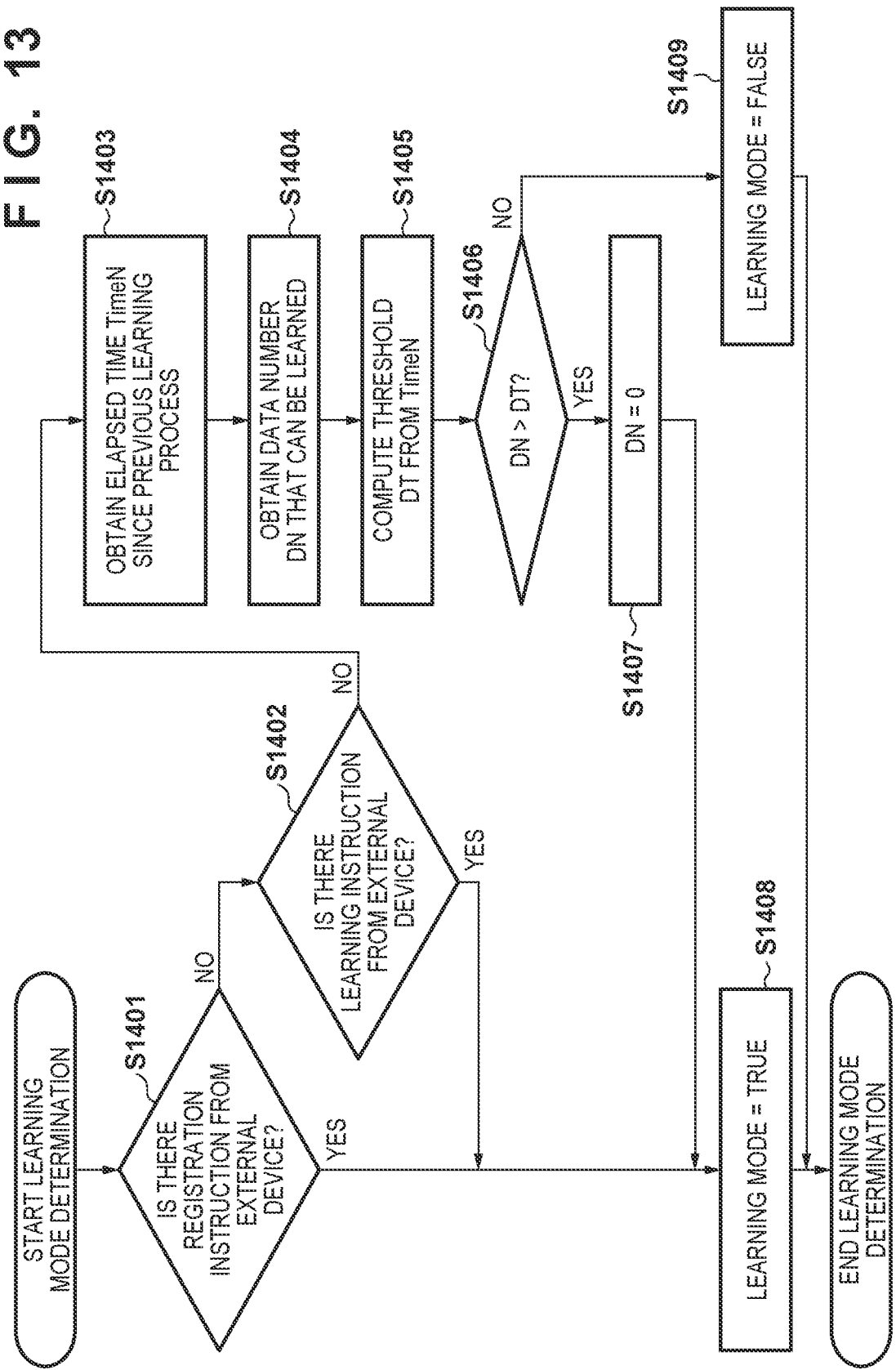

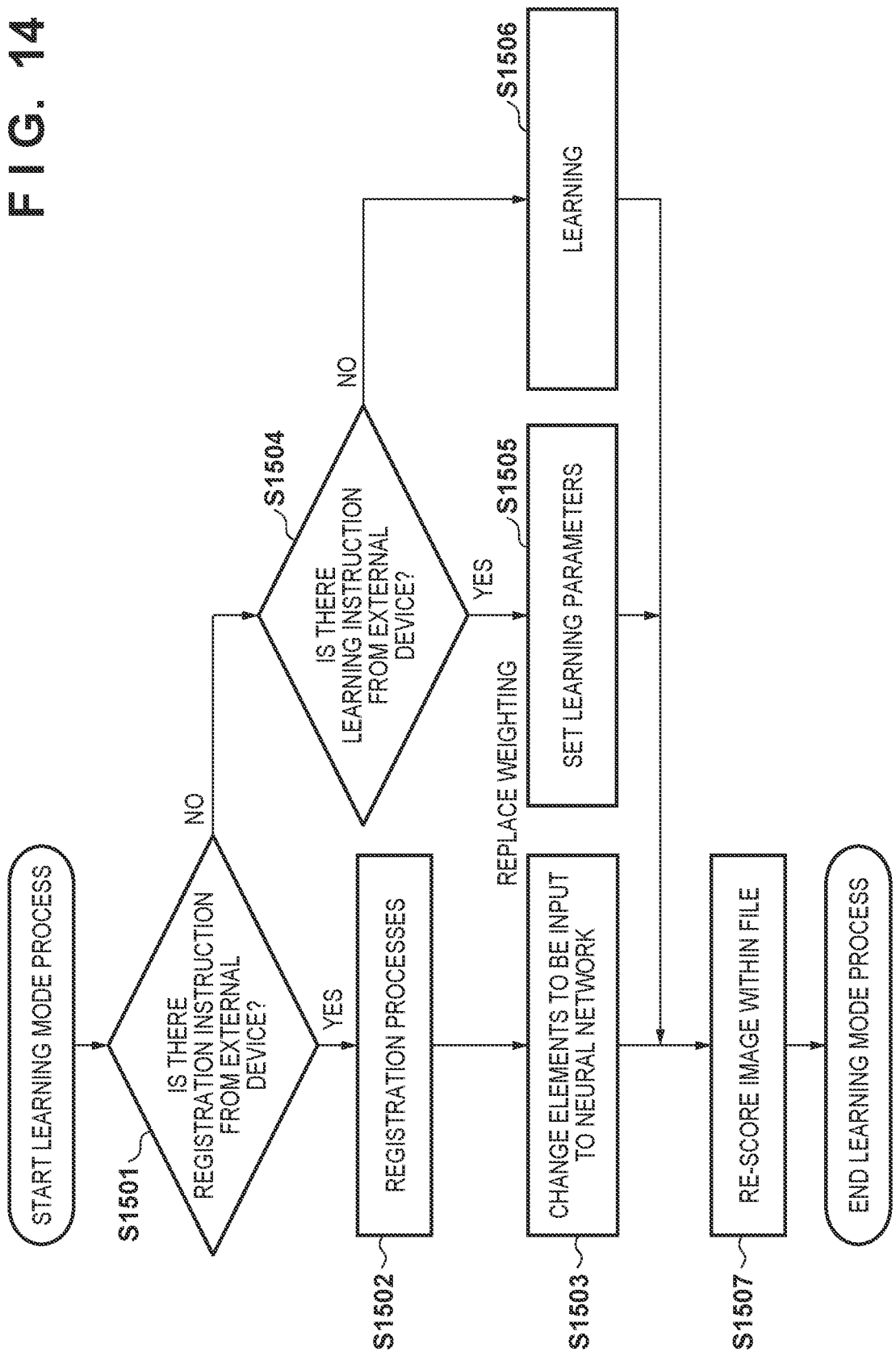

F I G. 18

| TYPE OF ATTACHMENT | OBJECT SEARCH RANGE | AUTOMATIC IMAGE CAPTURING CONTROL | TIMING AT WHICH LOW-POWER MODE IS TURNED ON AND OFF |
|---|---|---|---|
| FOR HANDHELD (FIG. 15A) (FIG. 16) | IN CASE OBJECT IS PRESENT IN DIRECTION IN WHICH CAMERA IS FACING, RANGE IS NARROW (1601 IN FIG. 16A) (1604 IN FIG. 16B) | IMAGE CAPTURING FREQUENCY: INCREASE WHEN OBJECT IS PRESENT IN DIRECTION IN WHICH CAMERA IS FACING IMAGE CAPTURING DIRECTION: LIMIT TO DIRECTION IN WHICH CAMERA IS FACING | DO NOT SET LOW-POWER MODE |
| FOR HUNG FROM NECK (FIG. 15B) (FIG. 10E) | RANGE AVOIDING APPEARANCE OF USER'S BODY (1322 IN FIG. 10E) | IMAGE CAPTURING FREQUENCY: SET TO CONSTANT INTERVAL OR CHANGE IN ACCORDANCE WITH CHANGE IN ENVIRONMENT ETC. IMAGE CAPTURING DIRECTION: PRIORITIZE FORWARD DIRECTION | ONCE PREDETERMINED NUMBER OF IMAGES CAPTURED, SET LOW-POWER MODE UNTIL USER MAKES LARGE MOVEMENT |
| FOR WEARABLE (FIG. 15C) | DIFFERENT DEPENDING ON USAGE | IMAGE CAPTURING FREQUENCY: DIFFERENT DEPENDING ON USAGE IMAGE CAPTURING DIRECTION: DIFFER IN ACCORDANCE WITH USAGE | DIFFERENT DEPENDING ON USAGE |
| FOR DESKTOP (FIG. 15D) (FIG. 17) | ALL DIRECTIONS (AVOID APPEARACE OF DESK AS MUCH AS POSSIBLE) (1702 IN FIG. 17A) (1703 IN FIG. 17B) | IMAGE CAPTURING FREQUENCY: REDUCE EACH TIME IMAGE IS CAPTURED, AND THEN INCREASE IF NEW PERSON OR CHANGE IN ENVIRONMENT ETC. DETECTED IMAGE CAPTURING DIRECTION: CAPTURE SURROUNDINGS UNIFORMLY | ONCE PREDETERMINED NUMBER OF IMAGES CAPTURED, SET TO LOW-POWER MODE |
| FOR MOVING BODY (FIG. 15D) | PRIORITIZE FORWARD DIRECTION | IMAGE CAPTURING FREQUENCY: CHANGE IN ACCORDANCE WITH MOVEMENT OF MOVING BODY IMAGE CAPTURING DIRECTION: PRIORITIZE FORWARD DIRECTION | IF TRAVEL DIRECTION DOES NOT CHANGE AND SPEED DOES NOT CHANGE GREATLY, SET LOW-POWER MODE AT SET INTERVALS |

IMAGE CAPTURING APPARATUS, METHOD FOR CONTROLLING THE SAME, AND STORAGE MEDIUM

CROSS-REFERENCE TO RELATED APPLICATIONS

This application is a continuation of U.S. patent application Ser. No. 16/902,602, filed on Jun. 16, 2020, which is a Continuation of International Patent Application No. PCT/JP2018/044548, filed Dec. 4, 2018, which claims the benefit of Japanese Patent Application No. 2017-242228, filed Dec. 18, 2017, and No. 2017-254402, filed Dec. 28, 2017, all of which are hereby incorporated by reference herein in their entirety.

BACKGROUND OF THE INVENTION

Field of the Invention

The present invention relates to automatic image capturing techniques used in image capturing apparatuses.

Background Art

Lifelogging cameras, which periodically take continuous shots without requiring shooting instructions from a user, are known (PTL 1). A lifelogging camera is used while affixed to the user's body with a strap or the like, and records scenes from the user's daily life as images, at set intervals of time. A lifelogging camera does not take shots at times specified by the user pressing a shutter button or the like. Rather, the camera automatically takes shots every set interval of time, which makes it possible to capture images of unanticipated moments that one would normally not shoot.

PTL 2 discloses a technique, applied in an image capturing apparatus configured to be capable of changing the capturing direction, in which an object is automatically searched out and shot. Even in automatic image capturing, composing the shot on the basis of a detected object makes it possible to improve the chance of capturing an image the user will like.

CITATION LIST

Patent Literature

PTL 1: Japanese Patent Laid-Open No. 2016-536868
PTL 2: Japanese Patent No. 05453953

When shooting images for the purpose of lifelogging, images of little interest to the user may be recorded as well. Automatically panning and tilting the camera to search out surrounding objects and take a shot at an angle of view that includes the detected objects can improve the chances of recording images the user will like.

However, when searching for objects in a state where the user wears the image capturing apparatus on his or her person, the image capturing apparatus itself is moving. As such, even if, after the search operations have been carried out, the image capturing apparatus is again pointed at the detected object in order to shoot the object, the object may already be out of sight. There are also situations where the object has moved away and is too small, making the object search meaningless. Such a situation is problematic not only in that the user cannot obtain an image he or she likes, but also in that battery power will be consumed in order to redo the object search, which reduces the amount of time for which images can be shot.

Having been achieved in light of the aforementioned issues, the present invention eliminates meaningless searching for an object, and increases the probability that an image the user likes can be obtained.

SUMMARY OF THE INVENTION

An image capturing apparatus according to the present invention comprises: an image capturing device configured to capture an object image; at least one processor or circuit configured to function as: an object detection unit configured to detect an object from image data captured by the image capturing device; a state detection unit configured to detect information pertaining to a state in which the image capturing apparatus is being held; and a control unit configured to control a range in which the object detection unit searches for an object, on the basis of state information of the image capturing apparatus detected by the state detection unit.

Further features of the present invention will become apparent from the following description of exemplary embodiments with reference to the attached drawings.

BRIEF DESCRIPTION OF THE DRAWINGS

The appended drawings, which are included in and constitute part of the specification, illustrate embodiments of the present invention, and along with those descriptions serve to illustrate the principles of the present invention.

FIG. 10D is a diagram illustrating area division within a captured image.

FIG. 10E is a diagram illustrating area division within a captured image.

FIG. 13 is a flowchart illustrating learning mode determination.

FIG. 14 is a flowchart illustrating a learning process.

FIG. 18 is a diagram illustrating control for each of attachment types.

DESCRIPTION OF THE EMBODIMENTS

Hereinafter, embodiments of the present invention will be described in detail with reference to the appended drawings.

First Embodiment

Camera Configuration

Figure 1A:
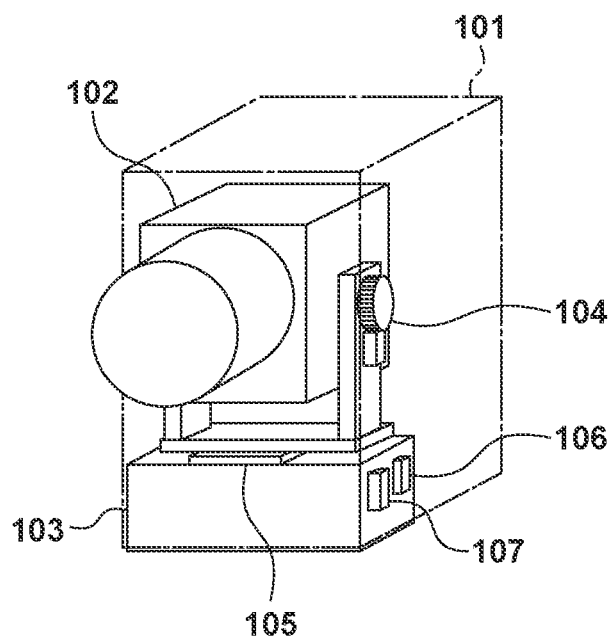
FIG. 1A is a diagram schematically illustrating the outside appearance of a camera serving as a first embodiment of an image capturing apparatus according to the present invention.
Figure 1B:
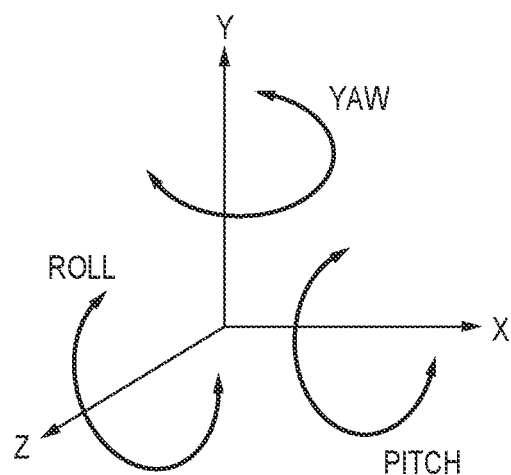
FIG. 1B is a diagram schematically illustrating the outside appearance of the camera serving as the first embodiment of the image capturing apparatus according to the present invention.

FIGS. 1A and 1B are diagrams schematically illustrating the outside appearance of a camera serving as a first embodiment of an image capturing apparatus according to the present invention. A camera 101 illustrated in FIG. 1A is provided with a power switch, operating members capable of making camera operations, and the like. A lens barrel 102, which includes an image capturing lens group, an image sensor, and the like in an integrated manner as an optical imaging system for capturing an object image, is attached to an anchoring part 103 of the camera 101 so as to be capable of moving. Specifically, the lens barrel 102 is attached to the anchoring part 103 through a tilt rotation unit 104 and a pan rotation unit 105, which are mechanisms capable of rotational driving relative to the anchoring part 103.

The tilt rotation unit 104 includes a motor driving mechanism capable of rotationally driving the lens barrel 102 in a pitch direction, which is indicated in FIG. 1B. The pan rotation unit 105 includes a motor driving mechanism capable of rotationally driving the lens barrel 102 in a yaw direction, which is also illustrated in FIG. 1B. In other words, the camera 101 has a mechanism that rotationally drives the lens barrel 102 in two axial directions. Each axis indicated in FIG. 1B is defined with respect to the position of the anchoring part 103. An angular velocity meter 106 and an acceleration meter 107 are disposed in the anchoring part 103 of the camera 101. The camera 101 detects oscillations on the basis of output signals from the angular velocity meter 106, the acceleration meter 107, and the like, and can correct shake, tilting, and the like in the lens barrel 102 by rotationally driving the tilt rotation unit 104 and the pan rotation unit 105. The angular velocity meter 106, the acceleration meter 107, and the like also detect movement in the camera on the basis of measurement results obtained at set intervals.

Figure 2:
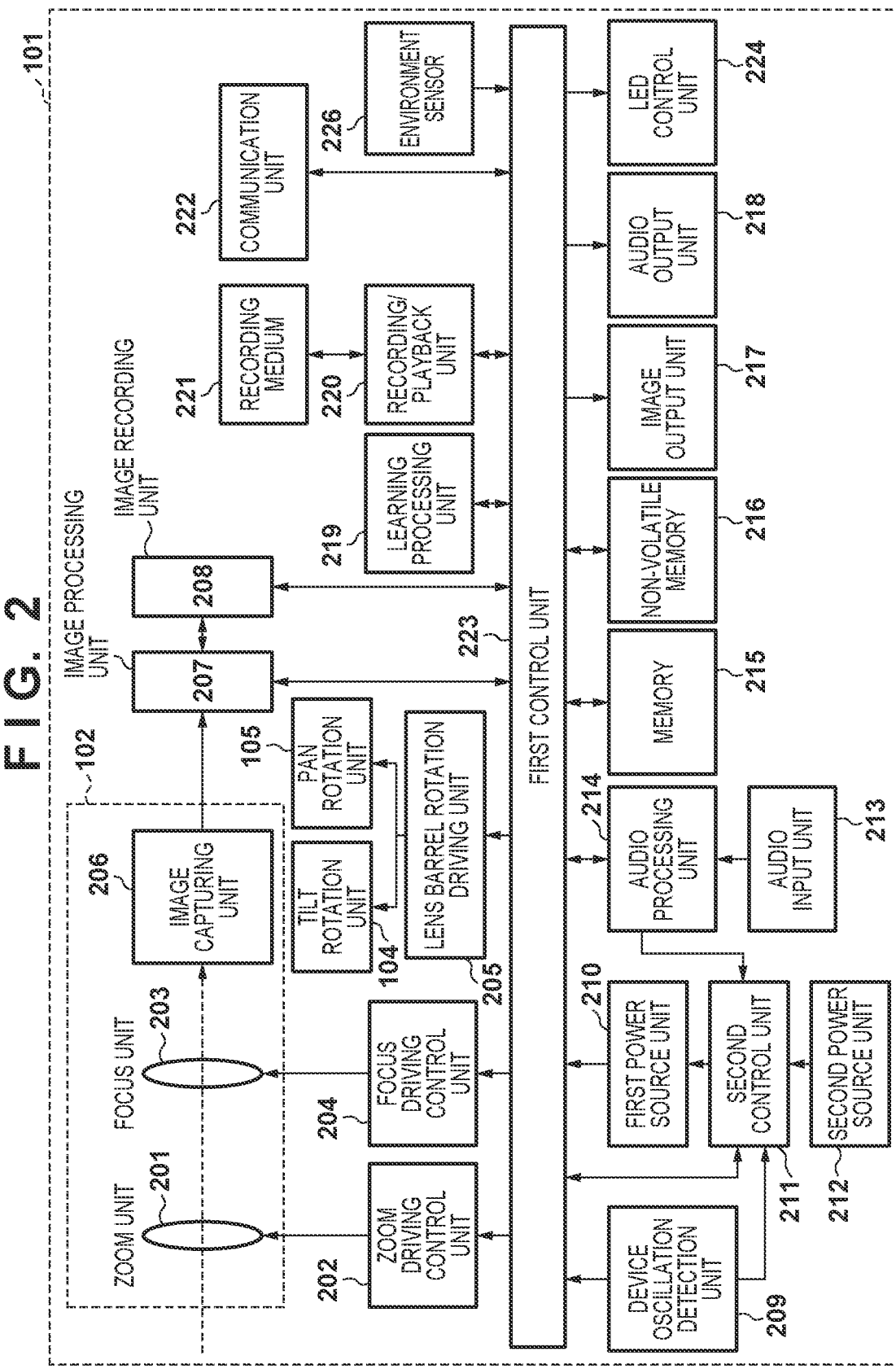
FIG. 2 is a block diagram illustrating the overall configuration of the camera according to the first embodiment.

FIG. 2 is a block diagram illustrating the overall configuration of the camera 101 according to the present embodiment. In FIG. 2, a first control unit 223 includes a CPU (an MPU), memory (DRAM, SRAM), and the like, for example. The first control unit 223 controls the respective blocks of the camera 101, controls the transfer of data among the blocks, and the like by executing various types of processing in accordance with programs stored in non-volatile memory (EEPROM) 216. The non-volatile memory 216 is electrically eraseable/recordable memory which stores operational constants, programs, and the like for the first control unit 223, as mentioned above.

In FIG. 2, a zoom unit 201 includes a zoom lens for carrying out magnification (enlarging and reducing the object image that is formed). A zoom driving control unit 202 controls the driving of the zoom unit 201, and detects the focal length at that time. A focus unit 203 includes a focus lens that adjusts the focus. A focus driving control unit 204 controls the driving of the focus unit 203. An image capturing unit 206 includes an image sensor. The image capturing unit 206 receives incident light through each lens group, and outputs information of a charge produced by the light amount to an image processing unit 207 as an analog image signal. Note that the zoom unit 201, the focus unit 203, and the image capturing unit 206 are disposed within the lens barrel 102.

The image processing unit 207 applies image processing such as distortion correction, white balance adjustment, color interpolation, and the like to digital image data obtained by A/D converting the analog image signal, and outputs the processed digital image data. The digital image data output from the image processing unit 207 is converted into a format for recording, such as JPEG, by an image recording unit 208, and is then stored in memory 215, sent to an image output unit 217 (described later), or the like.

A lens barrel rotation driving unit 205 causes the lens barrel 102 to rotate in the tilt direction and the pan direction by driving the tilt rotation unit 104 and the pan rotation unit 105. A device oscillation detection unit 209 includes the angular velocity meter (a gyrosensor) 106, which detects the angular velocity of the camera 101 in three axial directions, the acceleration meter (accelerometer) 107, which detects the acceleration of the camera 101 in three axial directions, and the like. The rotation angle, shift amount, and the like of the device are calculated on the basis of signals detected by these sensors.

An audio input unit 213 obtains signals of audio from the surroundings of the camera 101 through a microphone provided in the camera 101, converts the audio into a digital audio signal, and sends the signal to an audio processing unit 214. The audio processing unit 214 carries out processing pertaining to audio, such as optimization, on the input digital audio signal. The audio signal processed by the audio processing unit 214 is sent to the memory 215 by the first control unit 223. The memory 215 temporarily stores the image signals and audio signals obtained from the image processing unit 207 and the audio processing unit 214.

The image processing unit 207 and the audio processing unit 214 read out the image signal, the audio signal, and the like temporarily stored in the memory 215, and encode the image signal and audio signal to generate a compressed image signal and a compressed audio signal. The first control unit 223 sends the compressed image signal and the compressed audio signal to a recording/playback unit 220.

The recording/playback unit 220 records the compressed image signal and the compressed audio signal generated by the image processing unit 207 and the audio processing unit 214, other control data pertaining to image capturing, and the like in a recording medium 221. If the audio signal is not to be compressed and encoded, the first control unit 223 sends the audio signal generated by the audio processing unit 214 and the compressed image signal generated by the image processing unit 207 to the recording/playback unit 220 and causes those signals to be recorded into the recording medium 221.

The recording medium 221 may be a recording medium built into the camera 101 or a removable recording medium, and is capable of recording various types of data, such as compressed image signals, compressed audio signals, and audio signals generated by the camera 101. A medium having a larger capacity than the non-volatile memory 216 is typically used for the recording medium 221. For example, the recording medium 221 can be any type of recording medium, such as a hard disk, an optical disk, a magneto-optical disk, a CD-R, a DVD-R, magnetic tape, non-volatile semiconductor memory, or flash memory.

The recording/playback unit 220 reads out (or plays back) compressed image signals, compressed audio signals, audio signals, various types of data, programs, and the like recorded in the recording medium 221. The first control unit 223 then sends the read-out compressed image signals and compressed audio signals to the image processing unit 207 and the audio processing unit 214. The image processing unit 207 and the audio processing unit 214 store the compressed image signals and compressed audio signals in the memory 215 temporarily, decode the signals through a predetermined procedure, and send the decoded signals to the image output unit 217.

The audio input unit 213 is provided with a plurality of microphones. The audio processing unit 214 can detect the direction of a sound relative to a plane on which the plurality of microphones are arranged, and is thus able to search out objects, capture images automatically, and so on, which will be described later. Furthermore, the audio processing unit 214 detects specific voice commands. The configuration may be such that the user can register a specific voice in the camera as a voice command, in addition to several commands which are registered in advance. The audio processing unit 214 also recognizes sound scenes. In the sound scene recognition, a network trained in advance through machine learning on the basis of large amounts of audio data is used to determine a sound scene. For example, a network for detecting specific scenes, such as an audience cheering, the sound of applause, speaking, and so on is set in the audio processing unit 214, and this is used to detect specific sound scenes, specific voice commands, and so on. Upon detecting a specific sound scene or a specific voice command, the audio processing unit 214 outputs a detection trigger signal to the first control unit 223, a second control unit 211, or the like.

In addition to the first control unit 223, which controls the main system of the camera 101 as a whole, the camera 101 is provided with the second control unit 211, which controls the power supply of the first control unit 223. A first power source unit 210 and a second power source unit 212 supply power for operation to the first control unit 223 and the second control unit 211, respectively. Power is supplied first to the first control unit 223 and the second control unit 211 in response to a power button provided in the camera 101 being pressed. However, as will be described later, the first control unit 223 can itself carry out control for turning off the supply of power to the first power source unit 210. The second control unit 211 operates even while the first control unit 223 is not operating, and takes information from the device oscillation detection unit 209, the audio processing unit 214, and the like as inputs. The second control unit 211 determines whether or not the first control unit 223 is operating on the basis of various types of input information, and instructs the first power source unit 210 to supply power to the first control unit 223 when it is determined that the first control unit 223 is operating.

An audio output unit 218 outputs a pre-set audio pattern from a speaker built into the camera 101 during image capturing and the like, for example. An LED control unit 224 causes an LED provided in the camera 101 to light up on the basis of a pre-set lighting pattern or flashing pattern during image capturing and the like, for example. The image output unit 217 is constituted by image output terminals, for example, and outputs image signals for causing images to be displayed in a connected external display or the like. The audio output unit 218 and the image output unit 217 may be a single integrated terminal, e.g., a High-Definition Multimedia Interface (HDMI; registered trademark) terminal.

A communication unit 222 is a part for communication between the camera 101 and an external device, and sends and receives data such as audio signals, image signals, compressed audio signals, and compressed image signals, for example. The communication unit 222 also receives commands for starting and stopping image capturing, control signals pertaining to image capturing, such as panning, tilting, and zoom driving, and the like, and drives the camera 101 on the basis of instructions from the external device. The communication unit 222 also sends and receives information, such as various parameters pertaining to learning processed by a learning processing unit 219 (described later), between the camera 101 and the external device. For example, the communication unit 222 can include an infrared communication module, a Bluetooth (registered trademark) communication module, a wireless LAN communication module such as a Wireless LAN module, Wireless USB (registered trademark), or a GPS receiver, or the like.

An environment sensor 226 detects a state of the surrounding environment of the camera 101 every predetermined period. The environment sensor 226 includes a temperature sensor that detects the temperature around the camera 101, an atmospheric pressure sensor that detects changes in the atmospheric pressure around the camera 101, and an illumination sensor that detects the brightness around the camera 101. The environment sensor 226 further includes a humidity sensor that detects the humidity around the camera 101, a UV sensor that detects the amount of ultraviolet light around the camera 101, and so on. In addition to detected temperature information, atmospheric pressure information, brightness information, humidity information, and UV information, a temperature change amount, an atmospheric pressure change amount, a brightness change amount, a humidity change amount, an ultraviolet light change amount, and so on, which are obtained by calculating a rate of change in the various types of detected information at predetermined time intervals, are used for determining automatic image capturing and the like.

Communication with External Device

Figure 3:
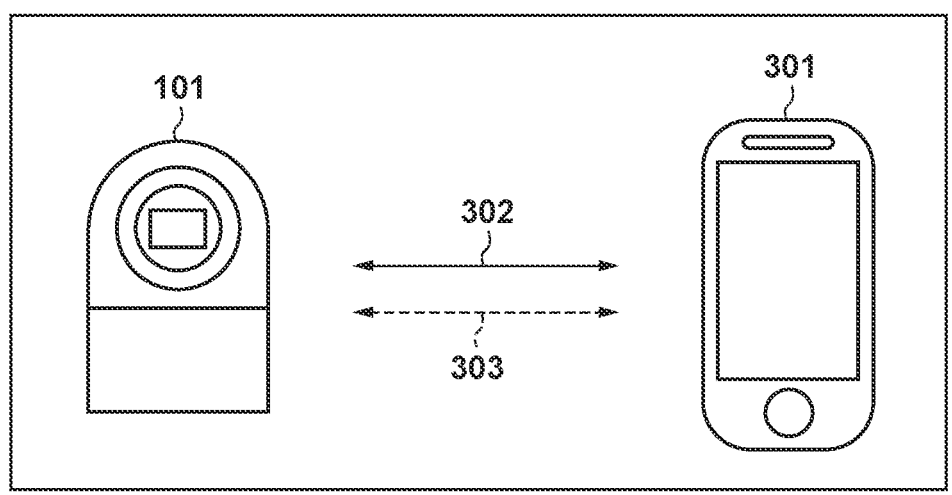
FIG. 3 is a diagram illustrating an example of the configuration of a wireless communication system between the camera and an external device.

FIG. 3 is a diagram illustrating an example of the configuration of a wireless communication system between the camera 101 and an external device 301. The camera 101 is a digital camera having an image capturing function, and the external device 301 is a smart device including a Bluetooth communication module and a wireless LAN communication module.

The camera 101 and the external device 301 are capable of communicating using first communication 302, which is carried out, for example, over a wireless LAN compliant with the IEEE 802.11 standard series, as well as second communication 303 having a master/slave relationship including a control station and a slave station, such as Bluetooth Low Energy (called "BLE" hereinafter), for example. Note that wireless LAN and BLE are merely examples of communication methods, and other communication methods may be used as long as the communication devices have two or more communication functions, and one of the communication functions is capable of controlling the other communication function in communication carried out according to a relationship between a control station and a slave station, for example. However, it is assumed that the first communication 302, which is wireless LAN or the like, is capable of communicating at higher speeds than the second communication 303, which is BLE or the like, and that the second communication 303 consumes less power, has a shorter communication range, or both, compared to the first communication 302.

Figure 4:
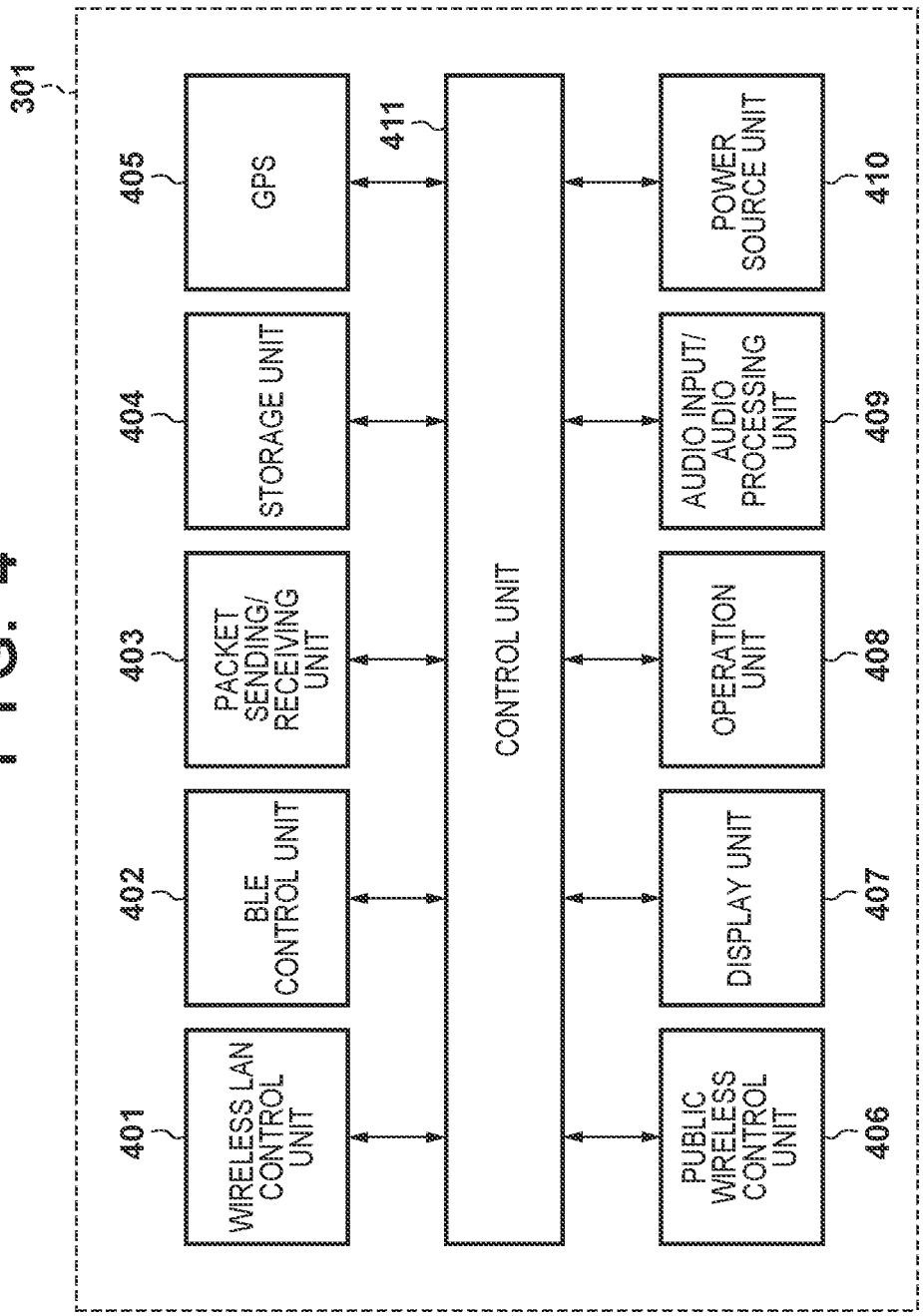
FIG. 4 is a diagram illustrating the configuration of the external device.

The configuration of the external device 301 will be described with reference to FIG. 4. In addition to a wireless LAN control unit 401 for wireless LAN and a BLE control unit 402 for BLE, the external device 301 includes a public wireless control unit 406 for public wireless communication. The external device 301 further includes a packet sending/receiving unit 403. The wireless LAN control unit 401 carries out RF control and communication processing for wireless LAN, driver processing for implementing various types of control of communication by wireless LAN compliant with the IEEE 802.11 standard series, protocol processing pertaining to communication over wireless LAN, and so on. The BLE control unit 402 carries out RF control and communication processing for BLE, driver processing for implementing various types of control of communication by BLE, protocol processing pertaining to communication by BLE, and so on. The public wireless control unit 406 carries out RF control and communication processing for public wireless communication, driver processing for implementing various types of control of public wireless communication, protocol processing pertaining to public wireless communication, and so on. The public wireless communication is compliant with the IMT (International Multimedia Telecommunications) standard, the LTE (Long Term Evolution) standard, or the like, for example. The packet sending/receiving unit 403 carries out processing for executing at least one of sending and receiving packets pertaining to wireless LAN and BLE communication, as well as public wireless communication. Although the present embodiment describes the external device 301 as carrying out at least one of the sending and receiving of packets in communication, it should be noted that a communication format aside from packet exchange, such as line exchange, may be used instead.

The external device 301 further includes a control unit 411, a storage unit 404, a GPS reception unit 405, a display unit 407, an operation unit 408, an audio input/audio processing unit 409, and a power source unit 410. The control unit 411 controls the external device 301 as a whole by executing a control program stored in the storage unit 404, for example. The storage unit 404 stores the control program executed by the control unit 411, various types of information such as parameters required for communication, and so on, for example. Various operations (described later) are implemented by the control unit 411 executing the control program stored in the storage unit 404.

The power source unit 410 supplies power to the external device 301. The display unit 407 has functionality rendering it capable of outputting visually-recognizable information using an LCD, LEDs, or the like, as well as performing audio output using a speaker or the like, and displays various types of information. The operation unit 408 includes buttons and the like that accept operations of the external device 301 made by a user, for example. Note that the display unit 407 and the operation unit 408 may be constituted by a common member such as a touch panel or the like, for example.

The audio input/audio processing unit 409 uses a generic microphone built into the external device 301, for example, to obtain voice issued by the user, and may be configured to use voice recognition processing to recognize operational commands from the user. Additionally, using a dedicated application in the external device 301, voice commands uttered by the user can be obtained and registered as specific voice commands to be recognized by the audio processing unit 214 of the camera 101 via the first communication 302, which uses wireless LAN.

The GPS (Global Positioning System) reception unit 405 receives a GPS signal communicated from a satellite, analyzes the GPS signal, and estimates the current position (longitude/latitude information) of the external device 301. Alternatively, the current position of the external device 301 may be estimated on the basis of information of wireless networks present in the surrounding area, by using WPS (Wi-Fi Positioning System) or the like. Movement information is communicated to the camera 101 via the BLE control unit 402 when the obtained current GPS position information is within a pre-set position range (within a range having a predetermined radius centered on a detection position), when the GPS position information has changed by greater than or equal to a predetermined amount, and so on. That information is then used as a parameter in automatic image capturing, automatic editing, and so on, which will be described later.

As described above, the camera 101 and the external device 301 exchange data through communication using the wireless LAN control unit 401 and the BLE control unit 402. For example, data such as audio signals, image signals, compressed audio signals, and compressed image signals, is sent and received. Additionally, image capturing instructions and the like, voice command registration data, a predetermined position detection notification based on the GPS position information, a location movement notification, and the like are sent from the external device 301 to the camera 101. Training data used in a dedicated application within the external device 301 is sent and received as well.

Configurations of Accessories

Figure 5:
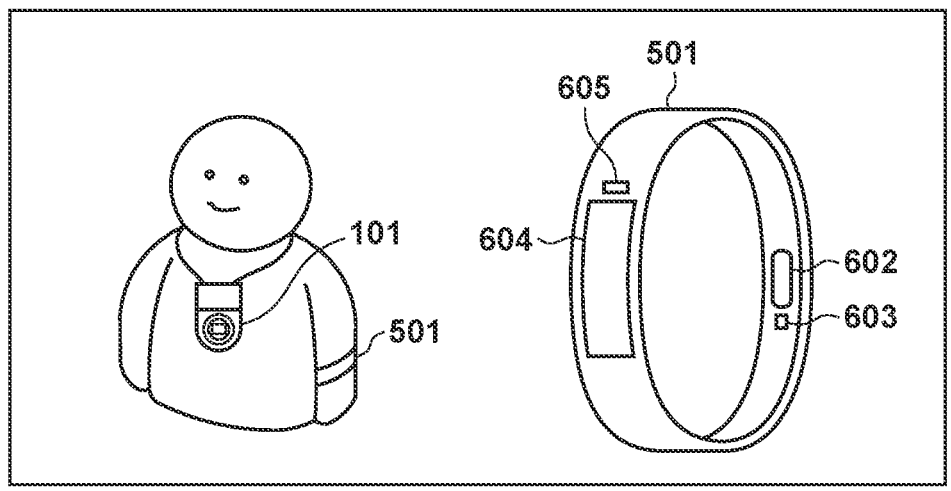
FIG. 5 is a diagram illustrating the configurations of the camera and the external device.

FIG. 5 is a diagram illustrating an example of the configuration of an external device 501 capable of communicating with the camera 101. The camera 101 is a digital camera having an image capturing function, and the external device 501 is a wearable device, including various types of sensing units, that is capable of communicating with the camera 101 using a Bluetooth communication module or the like, for example.

The external device 501 is configured to be capable of being attached to the arm or the like of the user, for example, and is equipped with a sensor that detects biological information such as the user's pulse, heartbeat, blood flow, and the like in a predetermined period, an accelerometer capable of detecting a movement state of the user, and the like.

A biological information detection unit 602 includes, for example, a pulse sensor that detects a pulse, a heartbeat sensor that detects a heartbeat, a blood flow sensor that detects blood flow, and a sensor that uses a conductive polymer to detect changes in electrical potential caused by skin contact. The present embodiment will describe a heartbeat sensor as being used as the biological information detection unit 602. The heartbeat sensor detects the user's heartbeat by using an LED or the like to irradiate the user's skin with infrared light, detecting the infrared light which has passed through body tissue using a light-receiving sensor, and processing the resulting signal. The biological information detection unit 602 outputs the detected biological information as a signal to a control unit 607 (see FIG. 6).

A shake detection unit 603, which detects the movement state of the user, includes an accelerometer, a gyrosensor, and the like, for example, and is capable of detecting motion on the basis of acceleration information, such as whether the user is moving, performing actions such as waving his or her arm, or the like. An operation unit 605 that accepts operations of the external device 501 by the user, and a display unit 604 that outputs visually-recognizable information, such as an LCD or LED monitor, are provided as well.

Figure 6:
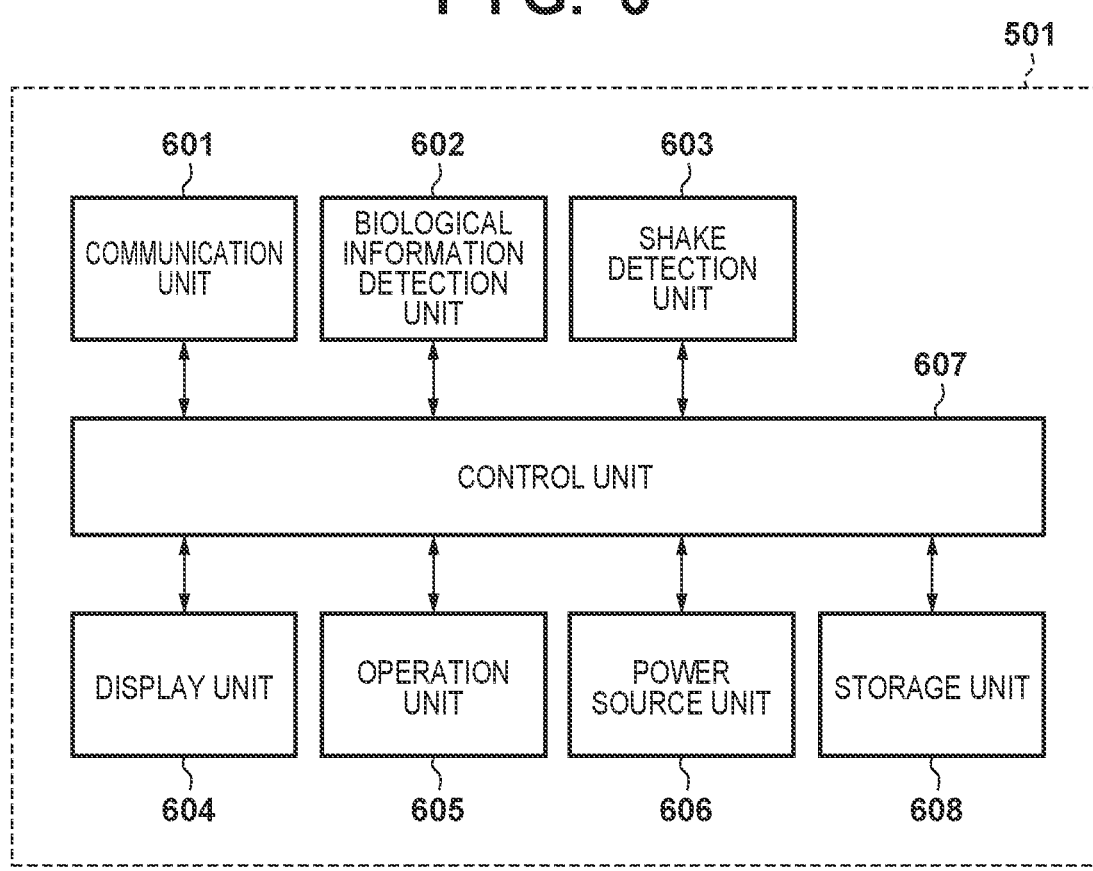
FIG. 6 is a diagram illustrating the configuration of the external device.

FIG. 6 is a diagram illustrating the configuration of the external device 501. As described above, the external device 501 includes, for example, the control unit 607, a communication unit 601, the biological information detection unit 602, the shake detection unit 603, the display unit 604, the operation unit 605, a power source unit 606, and a storage unit 608.

The control unit 607 controls the external device 501 as a whole by executing a control program stored in the storage unit 608, for example. The storage unit 608 stores the control program executed by the control unit 607, various types of information such as parameters required for communication, and so on, for example. Various operations (described later) are implemented by the control unit 607 executing the control program stored in the storage unit 608, for example.

The power source unit 606 supplies power to the external device 501. The display unit 604 has an output unit capable of outputting visually-recognizable information using an LCD, LEDs, or the like, as well as an output unit capable of outputting audio using a speaker or the like, and displays various types of information. The operation unit 605 includes buttons and the like that accept operations of the external device 501 made by a user, for example. Note that the display unit 604 and the operation unit 605 may be constituted by a common member such as a touch panel or the like, for example. The operation unit 605 uses a generic microphone built into the external device 501, for example, to obtain voice issued by the user, and may be configured to use voice recognition processing to recognize operational commands from the user.

The various types of detection information obtained by the biological information detection unit 602 and the shake detection unit 603, and processed by the control unit 607, are sent to the camera 101 by the communication unit 601. For example, detection information can be sent to the camera 101 at the timing at which a change in the user's heartbeat has been detected; or, detection information can be sent at the timing of the change in a movement state (state information) indicating walking movement, running movement, standing still, or the like. Additionally, detection information can be sent at the timing at which a pre-set arm waving motion has been detected; and detection information can be sent at the timing at which movement equivalent to a pre-set distance has been detected.

Camera Operation Sequence

Figure 7A:
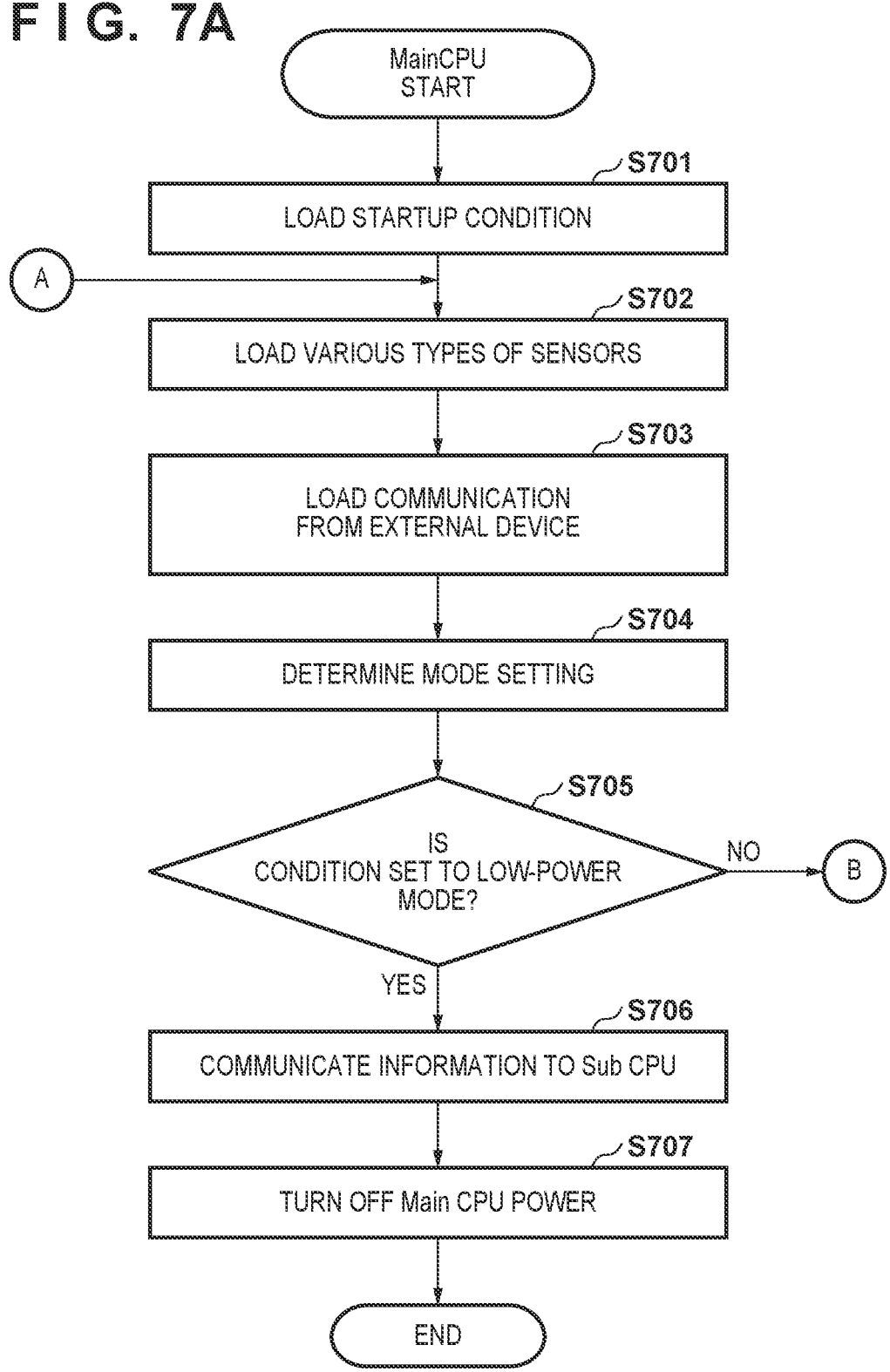
FIG. 7A is a flowchart illustrating operations carried out by a first control unit.
Figure 7B:
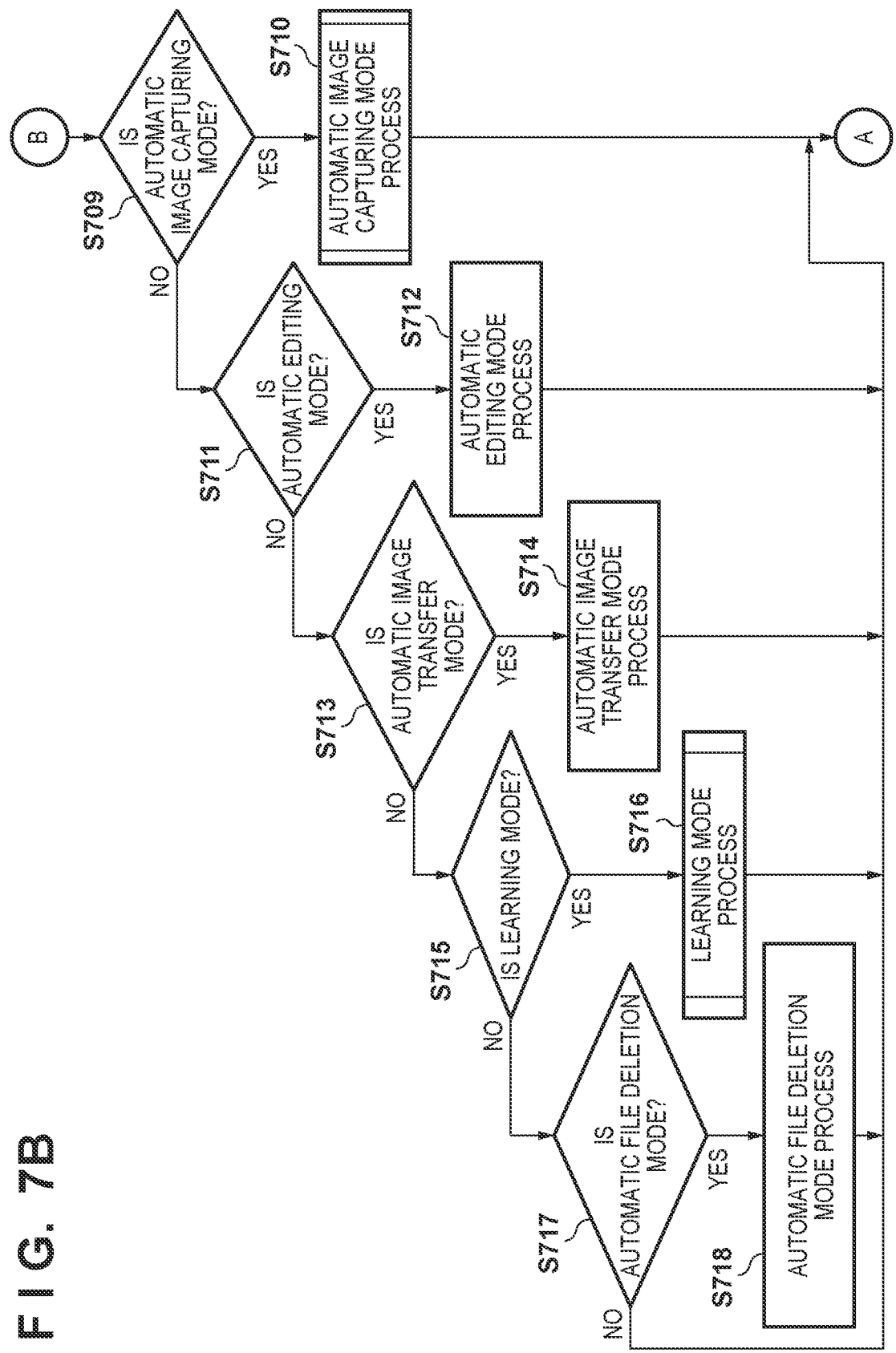
FIG. 7B is a flowchart illustrating operations carried out by the first control unit.

FIGS. 7A and 7B are flowcharts illustrating an example of operations handled by the first control unit 223 of the camera 101 according to the present embodiment.

When the user operates a power button provided on the camera 101, power is supplied from the first power source unit 210 to the first control unit 223 and the various blocks in the camera 101. Likewise, power is supplied from the second power source unit 212 to the second control unit 211. The operations of the second control unit 211 will be described in detail later with reference to the flowchart in FIG. 8.

The processing of FIGS. 7A and 7B starts when power is supplied. In step S701, a startup condition is loaded. In the present embodiment, the following three situations serve as conditions for starting up the power.

(1) When the power button is manually depressed and the power is turned on;

(2) when a startup instruction is sent from an external device (e.g., the external device 301) through external communication (e.g., BLE communication), and the power is turned on; and (3) when the power is turned on in response to an instruction from the second control unit 211.

Here, in the case of (3), i.e., when the power is turned on in response to an instruction from the second control unit 211, a startup condition computed within the second control unit 211 is loaded; this will be described in detail later with reference to FIG. 8. The startup condition loaded here is used as a single parameter during object searches, automatic image capturing, and the like, and this will be described later as well. Once the startup condition has been loaded, the sequence moves to step S702.

In step S702, detection signals are loaded from the various types of sensors. One of the sensor signals loaded here is a signal from a sensor that detects oscillation, such as the gyrosensor or the accelerometer in the device oscillation detection unit 209. Another signal is a signal indicating a rotational position of the tilt rotation unit 104, the pan rotation unit 105, and so on. Furthermore, an audio signal detected by the audio processing unit 214, a detection trigger signal for specific voice recognition, a sound direction detection signal, a detection signal for environment information detected by the environment sensor 226, and so on are other such signals. Once the detection signals have been loaded from the various types of sensors in step S702, the sequence moves to step S703.

In step S703, it is detected whether a communication instruction has been sent from the external device, and if such a communication instruction has been sent, communication is carried out with the external device. For example, remote operations made from the external device 301 through wireless LAN or BLE; the sending and receiving of audio signals, image signals, compressed audio signals, compressed image signals, and the like; operational instructions from the external device 301, such as for image capturing; sending voice command registration data; sending and receiving a predetermined position detection notification, location movement notification, training data, and the like on the basis of GPS position information; and so on are loaded. Additionally, when there is an update to user movement information, arm action information, biological information such as the heartbeat, and so on, that information is loaded from the external device 501 over BLE.

Although the above-described environment sensor 226 may be built into the camera 101, it may also be built into the external device 301 or the external device 501. In this case, the environment information is loaded over BLE in step S703. Once the communication with and loading from the external device has been carried out in step S703, the sequence moves to step S704.

In step S704, a mode setting determination is made, after which the sequence moves to step S705. In step S705, it is determined whether or not an operating mode is set to a low-power mode in step S704. If the operating mode is not an automatic image capturing mode, an automatic editing mode, an automatic image transfer mode, a learning mode, nor an automatic file deletion mode, which will be described later, the operating mode is determined to be the low-power mode. The sequence moves to step S706 when it is determined in step S705 that the operating mode is the low-power mode.

In step S706, various parameters pertaining to startup triggers determined within the second control unit 211 (shake detection determination parameters, voice detection determination parameters, and elapsed time detection parameters) are communicated to the second control unit 211 (a sub CPU). The values of the various parameters change as a result of learning carried out in a learning process, which will be described later. Once the process of step S706 ends, the sequence moves to step S707, where the first control unit 223 (a main CPU) is turned off, and the process ends.

If it is determined in step S705 that the operating mode is not the low-power mode, it is determined whether or not the mode setting is the automatic image capturing mode in step S704. The process for determining the mode setting in step S704 will be described here. The mode subject to the determination is selected from among the following modes.

(1) Automatic Image Capturing Mode
Mode Determination Conditions

The automatic image capturing mode is set when it is determined that automatic image capturing is to be carried out, on the basis of various types of detection information that have been learned and set (images, audio, time, oscillations, locations, body changes, environmental changes), the amount of time that has passed since transitioning to the automatic image capturing mode, past image capturing information/numbers of captured images, and so on.

Processing in the Mode

In the automatic image capturing mode processing (step S710), an object is automatically searched for through pan, tilt, and zoom operations driven on the basis of the various types of detection information (images, sounds, time, oscillations, locations, body changes, environmental changes). An image is then automatically captured when it is determined that an image which matches the user's preferences can be captured.

(2) Automatic Editing Mode
Mode Determination Conditions

The automatic editing mode is set when it is determined that automatic editing should be carried out, on the basis of the amount of time that has passed since the previous automatic editing and past captured image information.

Processing in the Mode

In the automatic editing mode processing (step S712), a process for selecting still images, moving images, and the like based on learning is carried out, and then an automatic editing process is carried out on the basis of learning, to create a highlight video which collects those images into a single moving image, according to image effects, a post-editing time of the moving image, and so on.

(3) Image Transfer Mode
Mode Determination Conditions

When the automatic image transfer mode is set in response to an instruction using a dedicated application in the external device 301, and it is determined that an image is to be automatically transferred on the basis of an amount of time that has passed since the previous image transfer and past captured image information, the automatic image transfer mode is set.

Processing in the Mode

In the automatic image transfer mode process (step S714), the camera 101 automatically extracts an image which is assumed to match the user's preferences, and that image which is assumed to match the user's preferences is automatically transferred to the external device 301. The image matching the user's preferences is extracted on the basis of a score for determining the user's preferences, which is added to the image, as will be described later.

(4) Learning Mode
Mode Determination Conditions

An automatic learning mode is set when it is determined that automatic learning should be carried out, on the basis of the amount of time that has passed since the previous learning process, as well as information integrated with images, a number of pieces of training data, and so on it can be used in learning. This mode is also set when an instruction for setting the learning mode has been made through communication from the external device 301.

Processing in the Mode

In the learning mode processing (step S716), learning based on the user's preferences is carried out using a neural network, on the basis of various types of operation information in the external device 301 (image obtainment information from the camera, information edited manually through a dedicated application, determination value information input by the user for images within the camera), notifications of training information from the external device 301, and so on. Learning pertaining to detection, such as personal authentication registration, voice registration, sound scene registration, and general physical object recognition registration, learning of the above-described conditions for the low-power mode, and the like are carried out at the same time.

(5) Automatic File Deletion Mode
Mode Determination Conditions

The automatic file deletion mode is set when it is determined that a file should be automatically deleted, on the basis of the amount of time that has passed since the previous automatic file deletion and the remaining capacity of the non-volatile memory 216 in which images are recorded.

Processing in the Mode

In the automatic file deletion mode processing (step S718), a file to be automatically deleted is specified from the images in the non-volatile memory 216 on the basis of tag information of the images, dates/times when the images were captured, and so on, and the file is then deleted.

The processing carried out in the above-described modes will be described in detail later.

Returning to the descriptions of FIGS. 7A and 7B, if it is determined in step S705 that the operating mode is not the low-power mode, the sequence moves to step S709, where it is determined whether or not the mode setting is the automatic image capturing mode. If the determination indicates that the operating mode is the automatic image capturing mode, the sequence moves to step S710, where the automatic image capturing mode processing is carried out. Once the processing ends, the sequence returns to step S702, and the processing is repeated. If it is determined in step S709 that the operating mode is not the automatic image capturing mode, the sequence moves to step S711.

In step S711, it is determined whether or not the mode setting is the automatic editing mode; if the operating mode is the automatic editing mode, the sequence moves to step S712, and the automatic editing mode processing is carried out. Once the processing ends, the sequence returns to step S702, and the processing is repeated. If it is determined in step S711 that the operating mode is not the automatic editing mode, the sequence moves to step S713. Note that the automatic editing mode is not directly related to the main concept of the present invention, and will therefore not be described in detail.

In step S713, it is determined whether or not the mode setting is the automatic image transfer mode; if the operating mode is the automatic image transfer mode, the sequence moves to step S714, and the automatic image transfer mode processing is carried out. Once the processing ends, the sequence returns to step S702, and the processing is repeated. If it is determined in step S713 that the operating mode is not the automatic image transfer mode, the sequence moves to step S715. Note that the automatic image transfer mode is not directly related to the main concept of the present invention, and will therefore not be described in detail.

In step S715, it is determined whether or not the mode setting is the learning mode; if the operating mode is the learning mode, the sequence moves to step S716, and the learning mode processing is carried out. Once the processing ends, the sequence returns to step S702, and the processing is repeated. If it is determined in step S715 that the operating mode is not the learning mode, the sequence moves to step S717.

In step S717, it is determined whether or not the mode setting is the automatic file deletion mode; if the operating mode is the automatic file deletion mode, the sequence moves to step S718, and the automatic file deletion mode processing is carried out. Once the processing ends, the sequence returns to step S702, and the processing is repeated. If it is determined in step S717 that the operating mode is not the automatic file deletion mode, the sequence returns to step S702, and the processing is repeated. Note that the automatic file deletion mode is not directly related to the main concept of the present invention, and will therefore not be described in detail.

Figure 8:
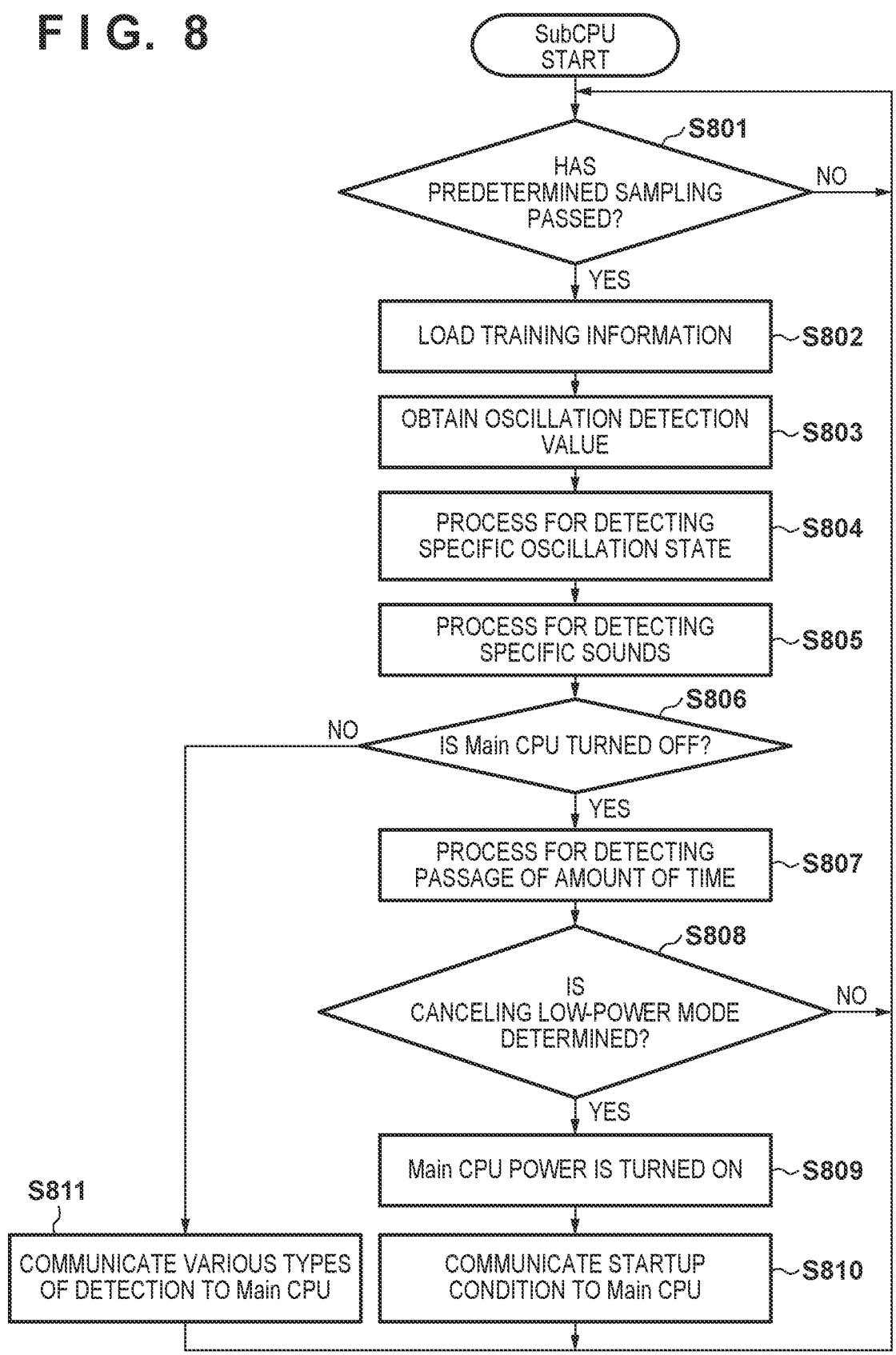
FIG. 8 is a flowchart illustrating operations carried out by a second control unit.

FIG. 8 is a flowchart illustrating an example of operations handled by the second control unit 211 of the camera 101 according to the present embodiment.

When the user operates the power button provided on the camera 101, power is supplied from the first power source unit 210 to the first control unit 223 and the various blocks in the camera 101. Likewise, power is supplied from the second power source unit 212 to the second control unit 211.

When the power is supplied, the second control unit (sub CPU) 211 is started up, and the processing illustrated in FIG. 8 starts. In step S801, it is determined whether or not a predetermined sampling period has passed. The predetermined sampling period is set to 10 ms, for example, and thus the sequence moves to step S802 every 10-ms period. The second control unit 211 stands by if it is determined that the predetermined sampling period has not passed.

In step S802, training information is loaded. The training information is information transferred when communicating information to the second control unit 211 in step S706 of FIG. 7A, and includes the following information, for example.

(1) determinations of detections of specific oscillations (used in step S804, described later)
(2) determinations of detections of specific sounds (used in step S805, described later)
(3) determining the amount of time that has passed (used in step S807, described later)

Once the training information is loaded in step S802, the sequence moves to step S803, where an oscillation detection value is obtained. The oscillation detection value is an output value from the gyrosensor, the accelerometer, or the like of the device oscillation detection unit 209.

Once the oscillation detection value is obtained in step S803, the sequence moves to step S804, where a process for detecting a pre-set specific oscillation state is carried out. Here, the determination process is changed depending on the training information loaded in step S802. Several examples will be described.

Tap Detection

A state in which the user strikes the camera 101 with his or her fingertip or the like (a tapped state) can be detected on the basis of an output value from the accelerometer 107 attached to the camera 101. By passing the output of the three-axis accelerometer 107 through a band pass filter (BPF) set to a specific frequency range every predetermined sampling period, a signal range corresponding to a change in acceleration caused by the tap can be extracted. A tap is detected on the basis of whether or not a number of times the acceleration signal obtained after the band pass filtering exceeds a predetermined threshold ThreshA within a predetermined time TimeA is a predetermined number CountA. CountA is set to 2 for a double tap, and to 3 for a triple tap. Note that TimeA and ThreshA can also be changed depending on the training information.

Oscillation State Detection

The oscillation state of the camera 101 can be detected on the basis of an output value from the gyrosensor 106, the accelerometer 107, and the like attached to the camera 101. High-frequency components of the outputs from the gyrosensor 106, the accelerometer 107, and the like are cut using a high-pass filter (HPF), and low-frequency components are cut by a low-pass filter (LPF), after which the output is converted into an absolute value. Oscillation is detected on the basis of whether or not the number of times the calculated absolute value exceeds a predetermined threshold ThreshB in a predetermined time TimeB is greater than or equal to a predetermined number CountB. This makes it possible to determine a state of low oscillation, where the camera 101 is placed on a desk or the like, for example, and a state of high oscillation, where the camera 101 has been affixed to the user's body as a wearable camera or the like and the user is walking. Fine oscillation states based on oscillation levels can also be detected by providing a plurality of determination thresholds, conditions for count numbers used for the determinations, and so on. Note that TimeB, ThreshB, and CountB can also be changed depending on the training information.

The foregoing describes a method in which a specific oscillation state is detected by determining a detection value from an oscillation detection sensor. However, it is also possible to use a trained neural network to detect a specific oscillation state registered in advance, by entering data sampled by an oscillation detection sensor during a predetermined time into an oscillation state determiner that uses a neural network. In this case, the training information loaded in step S802 is a weighting parameter for the neural network.

Once the process for detecting a specific oscillation state is carried out in step S804, the sequence moves to step S805, where a process for detecting a pre-set specific oscillation state is carried out. Here, the detection determination process is changed depending on the training information loaded in step S802. Several examples will be described.

Specific Voice Command Detection

A specific voice command is detected. The user can register a specific voice in the camera as a voice command, in addition to several commands which are registered in advance.

Specific Sound Scene Recognition

A network trained in advance through machine learning on the basis of large amounts of audio data is used to determine a sound scene. For example, specific scenes are detected, such as an audience cheering, the sound of applause, speaking, and so on. The detected scene is changed through learning.

Sound Level Determination

A sound level is detected by determining whether the volume of an audio level exceeds a predetermined volume for a predetermined amount of time. The predetermined amount of time, the predetermined volume, and the like change through learning.

Sound Direction Determination

The direction of a sound is detected for sound of a predetermined volume using a plurality of microphones arranged in a plane.

The stated determination process is carried out within the audio processing unit 214, and whether a specific sound has been detected is determined in step S805 using various settings learned in advance.

Once the process for detecting a specific sound is carried out in step S805, the sequence moves to step S806, where it is determined whether or not the power of the first control unit 223 is turned off. If the first control unit 223 (the main CPU) is turned off, the sequence moves to step S807, where a process for detecting the passage of a pre-set amount of time is carried out. Here, the detection determination process is changed depending on the training information loaded in step S802. The training information is information transferred when communicating information to the second control unit 211 in step S706 of FIG. 7A. The amount of time that has passed from when the first control unit 223 has transitioned from on to off is measured; if that amount of time is greater than or equal to a predetermined time TimeC, it is determined that the amount of time has passed, whereas if that amount of time is less than TimeC, it is determined that the amount of time has not passed. TimeC is a parameter that changes depending on the training information.

Once the process for detecting the amount of time that has passed is carried out in step S807, the sequence moves to step S808, where it is determined whether or not a condition for canceling the low-power mode is met. Whether to cancel the low-power mode is determined according to the following conditions.

(1) whether a specific oscillation has been detected
(2) whether a specific sound has been detected
(3) whether a predetermined amount of time has passed With respect to (1), whether or not a specific oscillation has been detected is determined through the specific oscillation state detection process carried out in step S804. With respect to (2), whether or not a specific sound has been detected is determined through the specific sound detection process carried out in step S805. With respect to (3), whether or not the predetermined amount of time has passed is determined through the process for detecting the passage of the amount of time carried out in step S807. If at least one of (1) to (3) is met, a determination is made to cancel the low-power mode.

Once the determination is made to cancel the low-power mode in step S808, the sequence moves to step S809, where the power of the first control unit 223 is turned on; then, in step S810, the condition for determining to cancel the low-power mode (oscillation, sound, or time) is communicated to the first control unit 223. The sequence then returns to step S801, and the process loops. If none of the conditions are met in step S808 and it is determined that there is no condition for canceling the low-power mode, the sequence returns to step S801, and the process loops.

On the other hand, if it is determined in step S806 that the first control unit 223 is on, the sequence moves to step S811, where the information obtained in steps S803 to S805 is communicated to the first control unit 223; the sequence then returns to step S801, and the process loops.

In the present embodiment, the configuration is such that the oscillation detection, the specific sound detection, and so on are carried out by the second control unit 211, and the detection results are communicated to the first control unit 223, even when the first control unit 223 is on. However, the configuration may be such that when the first control unit 223 is on, the processing of steps S803 to S805 is not carried out, and the oscillation detection, the specific sound detection, and so on are carried out through processing within the first control unit 223 (step S702 in FIG. 7A).

As described above, a condition for transitioning to the low-power mode, a condition for canceling the low-power mode, and so on are learned on the basis of user operations, by carrying out the processing of steps S704 to S707 in FIG. 7A, the processing of FIG. 8, and so on. This makes it possible to carry out camera operations that are more user-friendly for the user who possesses the camera 101. A method used for the learning will be described later.

Although the foregoing describes, in detail, a method for canceling the low-power mode in response to oscillation detection, sound detection, or the passage of time, the low-power mode may be canceled on the basis of environment information. The environment information can be determined on the basis of whether or not an absolute amount or a change amount of a temperature, an atmospheric pressure, a brightness, a humidity, and amount of ultraviolet light, or the like exceeds a predetermined threshold, and the threshold can also be changed through learning, which will be described later.

Additionally, detection information pertaining to oscillation detection, sound detection, or the passage of time, absolute values or change amounts in various types of environment information, and so on may be determined on the basis of a neural network, and used to determine whether to cancel the low-power mode. The determination conditions for this determination process can be changed through learning, which will be described later.

Automatic Image Capturing Mode Processing

The automatic image capturing mode processing will be described with reference to FIG. 9. First, in step S901, the image processing unit 207 carries out image processing on a signal obtained from the image capturing unit 206, and an image for object detection is generated. An object detection process for detecting a person, a physical object, or the like is carried out on the generated image.

When a person is to be detected, a face of the object, a human body, or the like is detected. In a face detection process, a pattern for determining a person's face is set in advance, and a location within the captured image that matches that pattern can be detected as a face region of a person. Additionally, a reliability level indicating the certainty of the object as a face is calculated at the same time. The reliability level is calculated on the basis of, for example, the size of the face region within the image, the degree to which the region matches a face pattern, or the like. The same applies to physical object recognition, where a physical object matching a pre-registered pattern is recognized.

There are also methods which extract a characteristic object using a histogram of hue, saturation, or the like within the captured image. A distribution is derived from the histogram of the hue, saturation, or the like, for an image of the object appearing within a captured angle of view, and that distribution is divided into a plurality of segments; then, a process is executed for classifying the captured image for each of those segments. For example, histograms are created for a plurality of color components of the captured image, and the histograms are then segmented into distribution ranges corresponding to the peaks; the image region of the object is then recognized by classifying the captured image according to regions belonging to the same combination of segments. An evaluation value is calculated for each recognized object image region, and the object image region having the highest evaluation value can be determined to be a main object region. Various pieces of object information can be obtained from captured image information using the foregoing method.

In step S902, an image blur correction amount is calculated. Specifically, first, an absolute angle of oscillation in the camera is calculated on the basis of angular velocity and acceleration information obtained by the device oscillation detection unit 209. Then, an angle for correcting image blur, by moving the tilt rotation unit 104 and the pan rotation unit 105 in an angular direction that cancels out the stated absolute angle, is found and taken as the image blur correction amount. Note that the calculation method used in the image blur correction amount calculation process described here can be changed through the learning process described later.

In step S903, a (holding) state of the camera is determined. The current oscillation/movement state of the camera is determined on the basis of a camera angle, a camera movement amount, and so on detected from angular velocity information, acceleration information, GPS position information, and so on. For example, when an image is captured having mounted the camera 101 to a vehicle, object information such as the surrounding scenery will change greatly depending on the distance traveled. Accordingly, whether or not the state is a "vehicular movement state", where the camera is mounted to a vehicle or the like and is moving at a high speed, is determined, and used in automatic object searching, which will be described later. Whether or not the camera angle is changing greatly is also determined, in order to determine whether or not the state is a "stationary capturing state", where the camera 101 experiences almost no oscillation. In the stationary capturing state, it can be assumed that the position of the camera 101 itself will not change, and thus an object search for stationary capturing can be carried out. When the camera angle undergoes relatively large changes, the state can be determined to be a "handheld state", and an object search for a handheld state can be carried out.

In step S904, an object search process is carried out. The object search is constituted by the following processes.
(1) area division
(2) calculating an importance level for each area
(3) determining a search target area
These processes will be described in order hereinafter.

(1) Area Division

Figure 10A:
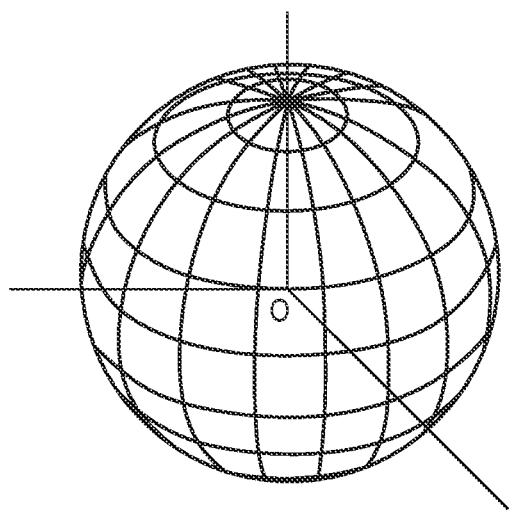
FIG. 10A is a diagram illustrating area division within a captured image.
Figure 10B:
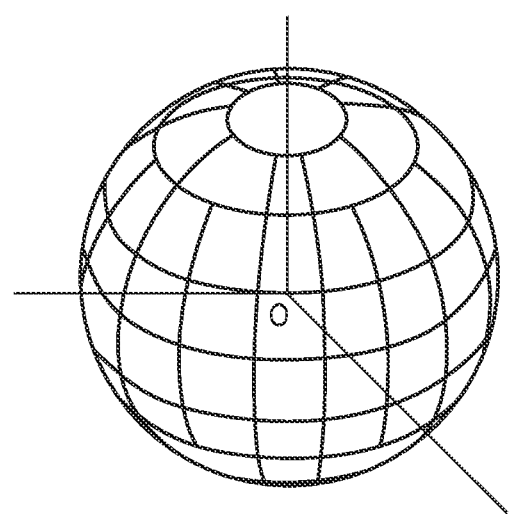
FIG. 10B is a diagram illustrating area division within a captured image.

Area division will be described with reference to FIGS. 10A to 10E. As illustrated in FIG. 10A, the entire periphery is divided into areas, using the position of the camera (when the camera position is indicated by an origin O) serving as the center. In the example illustrated in FIG. 10A, a division is made every 22.5 degrees in both the tilt direction and the pan direction. When the division is carried out as illustrated in FIG. 10A, the circles in the horizontal direction become smaller as the angle in the tilt direction moves away from 0 degrees, and thus the areas become smaller. Therefore, as illustrated in FIG. 10B, when the tilt angle is greater than or equal to 45 degrees, the range of the area in the horizontal direction is set to be greater than 22.5 degrees.

Figure 10C:
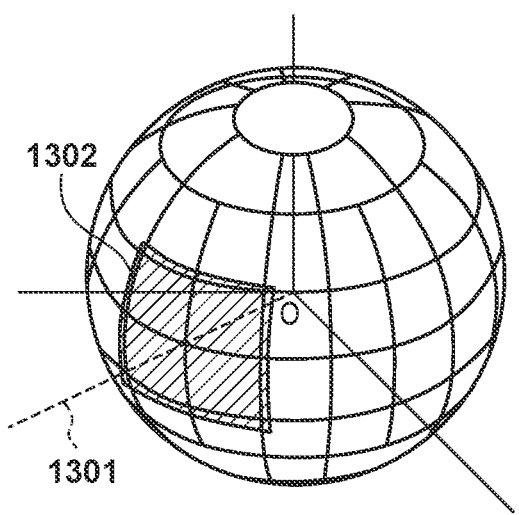
FIG. 10C is a diagram illustrating area division within a captured image.

FIGS. 10C and 10D illustrate examples of regions obtained by the area division within a captured angle of view. An axis 1301 indicates the orientation of the camera 101 in an initial state, and the area division is carried out using this direction as a reference position. 1302 indicates an angle of view area of the captured image, and FIG. 10D illustrates an example of the image obtained at that time. On the basis of the image division, the image within the captured angle of view is divided into images indicated by numbers 1303 to 1318 in FIG. 10D.

(2) Calculating an Importance Level for Each Area

An importance level indicating a priority ranking for the search is calculated for each area obtained through the above-described division, in accordance with the circumstances of an object present within that area, the circumstances of the scene, and so on. The importance level based on the circumstances of the object is calculated on the basis of, for example, a number of people present within the area, a size of the face of each person, an orientation of the face, the certainty of the facial detection, the expression of the person, a personal authentication result for the person, and so on. Additionally, the importance level based on the circumstances of the scene is calculated on the basis of, for example, a general physical object recognition result, a scene judgment result (blue sky, backlighting, a night scene, or the like), the level of a sound from the direction of the area, a voice recognition result, movement detection information from within the area, and so on.

Figure 9:
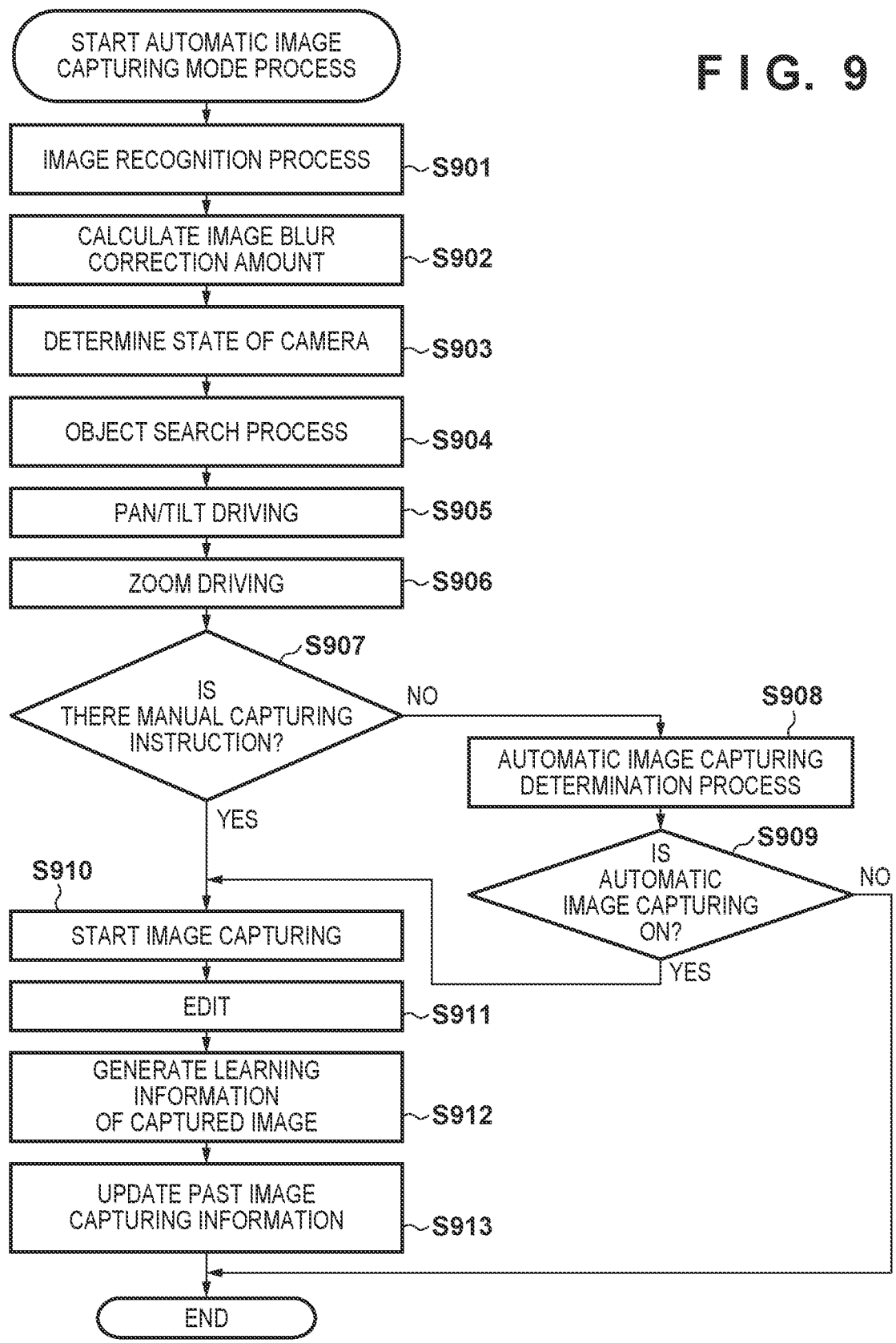
FIG. 9 is a flowchart illustrating operations carried out in image capturing mode processing.

Additionally, if camera oscillations have been detected in the camera state determination indicated in FIG. 9 (step S903), it is also possible to have the importance level change in accordance with the oscillation state. For example, if the "stationary capturing state" has been determined, a determination may be made to carry out the object search focusing on an object which is registered for facial authentication and which has a high priority level (e.g., the owner of the camera). The automatic image capturing, which will be described later, may also be carried out with priority given to the face of the camera's owner, for example. As a result, even if the owner of the camera often captures images while walking with the camera affixed to his or her person, the owner can obtain many images in which he or she appears by removing the camera and placing it on a desk or the like. At this time, facial searches can be carried out through panning and tilting, and thus images in which the owner appears, group shots showing many faces, and the like can be obtained simply by placing the camera as desired without particular concern for the camera's placement angle or the like.

Note that under the above-described conditions alone, the same areas will have the highest importance level as long as there are no changes in each area, and thus the area which is searched out will remain the same indefinitely. Accordingly, the importance level is changed in accordance with past image capturing information. Specifically, the importance level of an area which has been continually designated as a search area for a predetermined amount of time may be reduced, the importance level of an area in which an image has been captured in step S910, which will be described later, may be reduced for a predetermined amount of time, or the like.

Furthermore, when the camera is moving, such as when the camera's owner wears the camera on his or her body, when the camera is attached to a vehicle, or the like, there are situations where even if an object in the periphery is searched out through panning and tilting, the object will already be out of sight by the time an image can be captured. There are also situations where the object has moved away and is too small, making the object search meaningless. Accordingly, a movement direction, movement speed, and the like of the camera are calculated from the angular velocity information, acceleration information, and GPS position information of the camera detected in step S903, and furthermore from a motion vector calculated for each of coordinates from the captured image. Based on these, an area distant from the travel direction may be assumed from the start to not have an object, or conversely, the search time interval may be changed in accordance with the movement speed, such as by shortening the object search time interval during high-speed movement, in order to ensure that an important object is not missed.

Specifically, a state in which the camera is hung from the neck will be described with reference to FIG. 10E. FIG. 10E is a schematic diagram illustrating a person, looking down from above the person. 1320 indicates the person (the owner of the camera), 1321 indicates the camera, and 1322 and 1323 indicate object search ranges, respectively. The object search ranges are set to, for example, angular ranges which are substantially horizontally symmetrical with respect to a travel direction 1324 of the camera. The object search range 1322 indicates an object search range in a state where the person is completely stopped. A 360-degree search is not carried out in order to limit the angle of view to one in which the body, clothing, and so on of the camera's owner does not take up more than a set region, so as to prevent the body of the camera owner from appearing in the image.

The object search range 1323 indicates a search range for when the person is moving in the direction indicated by the diagram (the travel direction 1324). Thus by changing the object search range in accordance with the movement speed, e.g., by narrowing the range when the movement speed is high and broadening the range when the movement speed is low, an object search which is not wasteful can be carried out in an adaptive manner. Although FIG. 10E only indicates the object search range as changing in the horizontal direction, this process may be carried out in the same manner in the vertical direction as well. Additionally, the "travel direction" referred to here is calculated on the basis of measurement results obtained by the angular velocity meter 106, the acceleration meter 107, and the like over a set period. This makes it possible to prevent the search range from changing frequently, even when the movement is not stable.

Furthermore, to prevent the object search range from becoming indefinite due to sudden changes in the travel direction, the sensitivity may be reduced by taking into account past travel directions. Although FIG. 10E illustrates a situation where the camera is hung from the neck, the process for changing the object search range according to the movement speed can be omitted if it can be determined that the camera has been placed on a desk. As such, the object search processing may be changed in accordance with changes in the state of the camera, such as whether the camera is in a handheld state, hung from the neck, in a wearable state, placed on a desk, attached to a moving body, or the like. Changing the object search range in accordance with the movement information eliminates waste in the object search, and also contributes to a reduction in battery power consumption.

(3) Determining a Search Target Area

Once the importance level has been calculated for each area as described above, an area with a high importance level is set as a search target area. Then, pan/tilt search target angles necessary for capturing the search target area within the angle of view are calculated.

Returning to the descriptions of FIG. 9, in step S905, pan/tilt driving is carried out. Specifically, a pan/tilt driving amount is calculated by adding the image blur correction amount in a control sampling frequency to driving angles based on the pan/tilt search target angles. Then, the driving of the tilt rotation unit 104 and the pan rotation unit 105 is controlled by the lens barrel rotation driving unit 205.

In step S906, zoom driving is carried out by controlling the zoom unit 201. Specifically, the zoom driving is carried out in accordance with the state of the search target object determined in step S904. For example, when the search target object is the face of a person, if the face is too small in the image, the face may be below the minimum size required for detection, making it impossible to detect the face; there is a risk that the face will be missed as a result. In such a case, control is carried out to increase the size of the face in the image by zooming toward the telephoto side. On the other hand, if the face is too large in the image, the object is more likely to move outside the angle of view due to movement of the object, the camera itself, and so on. In such a case, control is carried out to reduce the size of the face in the image by zooming toward the wide-angle side. Controlling the zoom in this manner makes it possible to maintain a state suited to the tracking of the object.

In step S907, it is determined whether or not an image capturing instruction has been made manually, and if a manual image capturing instruction has been made, the sequence moves to step S910. At this time, the manual image capturing instruction may be a shutter button being depressed, the camera housing being lightly struck (tapped) with a fingertip or the like, a voice command being input, an instruction from an external device, or the like. An image capturing instruction that uses a tap operation as a trigger is determined by using the device oscillation detection unit 209 to detect high-frequency acceleration continuing for a short period when the user taps the camera housing. Voice command input is an image capturing instruction method which, when the user has uttered a predetermined phrase instructing an image to be captured (e.g., "take a picture" or the like), uses the audio processing unit 214 to recognize the voice and use it as a trigger for capturing an image. Using an instruction from an external device is an image capturing instruction method which takes, as a trigger, a shutter instruction signal sent from a smartphone or the like connected to the camera over Bluetooth, for example, using a dedicated application.

If there is no manual image capturing instruction in step S907, the sequence moves to step S908, where an automatic image capturing determination is carried out. In the automatic image capturing determination, a determination as to whether or not to carry out automatic image capturing, as well as a determination as to the capturing method (whether to capture a still image, capture a moving image, carry out continuous shooting, carry out panoramic shooting, or the like), are made.

Determining Whether or Not to Carry out Automatic Image Capturing

The determination as to whether or not to carry out automatic image capturing is made as follows. Specifically, a determination to execute automatic image capturing is made in the following two cases. In one case, a determination to carry out automatic image capturing is made when, on the basis of the importance levels obtained for each of the areas in step S904, the importance level is greater than a predetermined value. In the other case, the determination is based on a neural network.

Figure 11:
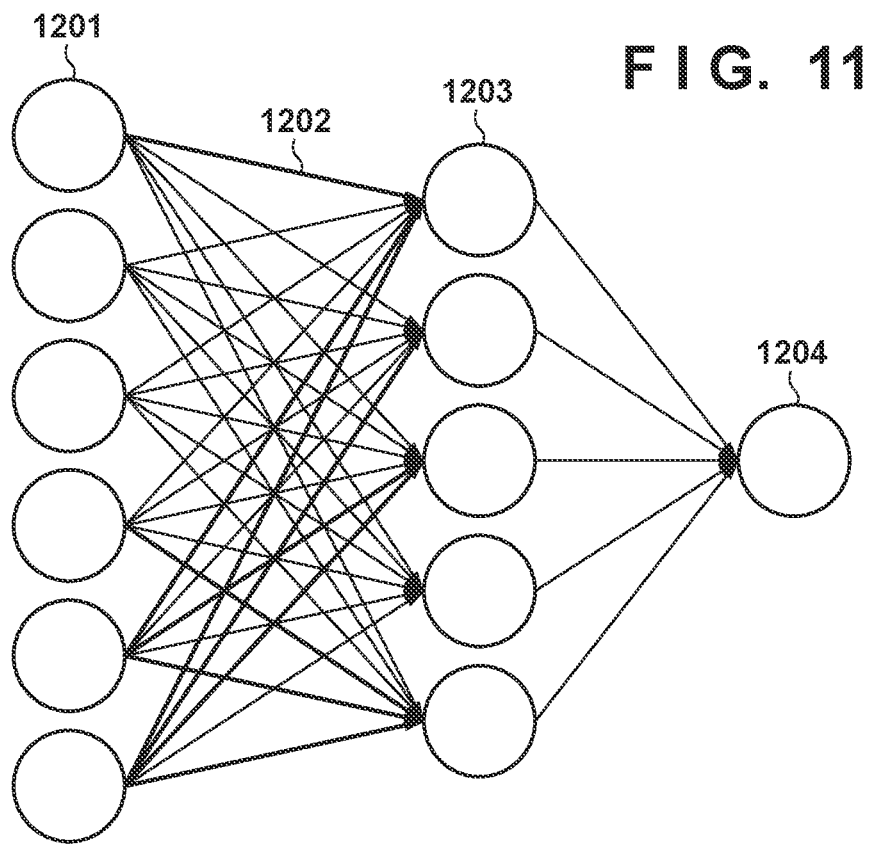
FIG. 11 is a diagram illustrating a neural network.

FIG. 11 illustrates an example of a network constituted by a multilayer perceptron, as one example of a neural network. A neural network is used to predict an output value from an input value, and by training the network in advance using input values and output values that serve as models for those inputs, an output value that conforms to the learned model can be estimated for a new input value. Note that the learning method will be described later. In FIG. 11, 1201, and the circles arranged vertically therebelow, indicate neurons in an input layer; 1203, and the circles arranged vertically there below, indicate neurons in an intermediate layer; and 1204 indicates a neuron in an output layer. The arrows, such as that indicated by 1202, indicate connections between the neurons. In a determination based on a neural network, an object appearing in the current angle of view, a feature amount based on a scene or the camera state, or the like is supplied to the neurons in the input layer as an input, and a value output from the output layer is obtained after computations are carried out based on forward propagation of the multilayer perceptron. If the output value is greater than or equal to a threshold, a determination to carry out automatic image capturing is made. Note that the following are used as features of the object: a current zoom ratio; a general physical object recognition result at the current angle of view; a face detection result; a number of faces appearing in the present angle of view; a degree to which a face is smiling; a degree to which eyes are closed; a face angle; a facial authentication ID number; an angle of the line of sight of a person serving as the object; a scene determination result; an amount of time that has passed since the previous instance of image capturing; the current time; GPS position information and a change amount from the previous image capturing position; a current audio level; a person using his or her voice; whether or not people are applauding or cheering; oscillation information (acceleration information, camera state); environment information (temperature, atmospheric pressure, illumination, humidity, ultraviolet light amount); and so on. Furthermore, if information has been communicated from the external device 501, the communicated information (user movement information, arm action information, biological information such as a heartbeat, and so on) is also used as a feature. This feature is converted into a numerical value in a predetermined range, and is supplied to the neurons in the input layer as a feature amount. Accordingly, the neurons in the input layer require an equivalent number of feature amounts to be used.

Note that with a determination based on a neural network, the output values can be changed by using the learning process, which will be described later, to vary the weights on the connections between the neurons, and the result of the determination can then be applied to the learning result.

Additionally, the determination of the automatic image capturing can be changed in accordance with the startup condition for the first control unit 223, loaded in step S702 of FIG. 7A. For example, if the unit is started up in response to a tap being detected or a specific voice command, it is highly likely that that operation indicates that the user currently wishes to capture an image. Accordingly, a setting is made to increase the frequency of image capturing.

Determining the Image Capturing Method

When determining the image capturing method, whether to capture a still image, capture a moving image, carry out continuous shooting, capture a panoramic image, or the like is determined on the basis of the camera state, the state of objects in the periphery, and so on detected in steps S901 to S904. For example, a still image is captured when the object (the person) is at rest, whereas a moving image or a continuous image is captured when the object is moving. Additionally, if there are a plurality of objects surrounding the camera, or it has been determined on the basis of the aforementioned GPS information that the location is a scenic spot, a panoramic image capturing process, which generates a panoramic image by combining images captured sequentially while carrying out pan/tilt operations, may be executed. As with the determination method used in "determining whether or not to carry out automatic image capturing", various types of information detected before the image capturing can be determined on the basis of a neural network, and the image capturing method can then be set. The determination conditions for this determination process can be changed through a learning process, which will be described later.

Returning to the descriptions of FIG. 9, if in step S909 the automatic image capturing determination carried out in step S908 has resulted in a determination to carry out automatic image capturing, the sequence moves to step S910; however, if a determination to carry out automatic image capturing has not been made, the automatic image capturing mode processing ends.

In step S910, automatic image capturing is started. At this time, the image capturing is started using the image capturing method determined in step S908. At that time, autofocus control is carried out by the focus driving control unit 204. Additionally, exposure control is carried out using an aperture control unit, a sensor gain control unit, a shutter control unit, and so on (not shown), so that the object is captured at an appropriate brightness. Furthermore, after the image capturing, the image processing unit 207 carries out various types of known image processing, such as white balance processing, noise reduction processing, gamma correction processing, and the like, in order to generate an image.

Note that during this image capturing, the person whose image is to be captured by the camera may be notified to that effect before the image is captured, if a predetermined condition is satisfied. Emitting sound from the audio output unit 218, lighting an LED using the LED control unit 224, and so on can be employed as methods for making such a notification, for example. The predetermined condition is, for example: a number of faces in the present angle of view; a degree to which a face is smiling; a degree to which eyes are closed; an angle of the line of sight or a face angle of a person serving as the object; a facial authentication ID number; a number of people registered for personal authentication; a general physical object recognition result at the time of image capturing; a scene determination result; an amount of time that has passed since the previous image was captured; an image capturing time; whether or not the current position based on GPS information is a scenic spot; an audio level at the time of the image capturing; whether or not there is a person emitting sound; whether or not there is applause or cheering; oscillation information (acceleration information, camera state); environment information (temperature, atmospheric pressure, illumination, humidity, ultraviolet light amount); and so on. By capturing images with a notification on the basis of these conditions, an image in which a person is looking at the camera in a favorable manner can be obtained in scenes of high importance.

With this notification before capturing an image too, information of the captured image, or various types of information detected before the image capturing, can be determined on the basis of a neural network, and the notification method, timing and so on can then be set. The determination conditions for this determination process can be changed through a learning process, which will be described later.

In step S911, an editing process is carried out for processing the image generated in step S910, adding a moving image, and so on. "Processing the image" refers specifically to a trimming process based on the face of the person, an in-focus position, and so on; an image rotation process; an HDR (high dynamic range) effect process; a bokeh effect process; a color conversion filter effect process; and so on. In the image processing, a plurality of processed images resulting from combinations of the aforementioned processes may be generated on the basis of the image generated in step S910, and stored separate from the image generated in step S910. With respect to moving image processing, a process may be carried out for adding a moving image or a still image that has been captured while imparting special effect processing such as sliding, zooming, fading, and so on to the generated edited moving image. With this editing in step S911, information of the captured image, or various types of information detected before the image capturing, can be determined on the basis of a neural network, and the image processing method can then be set. The determination conditions for this determination process can be changed through a learning process, which will be described later.

In step S912, a captured image training information generation process is carried out. Here, information used in the learning process, which will be described later, is generated and recorded. Specifically, the following information of the current captured image is used: a zoom ratio from when the image was captured; a general physical object recognition result from when the image was captured; a face detection result; a number of faces appearing in the captured image; a degree to which a face is smiling; a degree to which eyes are closed; a face angle; a facial authentication ID number; an angle of the line of sight of a person serving as the object; a scene determination result; an amount of time that has passed since the previous instance of image capturing; the time at which the image was captured; GPS position information and a change amount from the previous image capturing position; an audio level when the image was captured; a person using his or her voice; whether or not people are applauding or cheering; oscillation information (acceleration information, camera state); environment information (temperature, atmospheric pressure, illumination, humidity, ultraviolet light amount); a moving image capturing time; whether or not the image capturing instruction was made manually; and so on. Furthermore, a score, which is a neural network output expressing the user's image preferences as a numerical value, may be computed as well. This information is generated and recorded as tag information in a captured image file. Alternatively, the information may be written into the non-volatile memory 216, or the information of each captured image may be stored in the recording medium 221 in list format as what is known as "catalog data".

In step S913, past image capturing information is updated. Specifically, with respect to a number of images captured per area as described in step S908, a number of images captured per person who has undergone personal authentication registration, a number of images captured for each object recognized in the general physical object recognition, and a number of images captured per scene in the scene determination, the count of the number of images captured this time is increased by one.

Learning Process

Learning based on the user's preferences, according to the present embodiment, will be described next. In the present embodiment, learning based on the user's preferences is carried out by the learning processing unit 219, using a neural network such as that illustrated in FIG. 11 and a machine learning algorithm. A neural network is used to predict an output value from an input value, and by training the network in advance using actual values for input values and actual values for output values, output values can be estimated for new input values. By using a neural network, learning based on the user's preferences is carried out with respect to the above-described automatic image capturing, automatic editing, object searching, and the like. Additionally, operations are also carried out for using learning to change the registration of object information to serve as feature data for input into the neural network (results of facial authentication, general physical object recognition, and the like), control image capturing notifications, control the low-power mode, delete files automatically, and the like.

In the present embodiment, the operations to which the learning process is applied are the following operations.

(1) automatic image capturing
(2) automatic editing
(3) object searches
(4) object registration
(5) image capturing notification control
(6) low-power mode control
(7) automatic file deletion
(8) image blur correction
(9) automatic image transfer Of the aforementioned operations to which the learning process is applied, automatic editing, automatic file deletion, and automatic image transfer are of no direct relation to the main concept of the present invention, and will therefore not be described.

Automatic Image Capturing

Learning for automatic image capturing will be described here. In automatic image capturing, learning for automatically capturing an image that matches the user's preferences is carried out. As described with reference to the flowchart in FIG. 9, a training information generation process (step S912) is carried out after an image is captured (after step S910). An image to be learned is selected through a method which will be described later, and the neural network is trained by changing the weighting thereof on the basis of the training information included in the image.

The training is carried out by changing the neural network that determining the timing of the automatic image capturing, and changing the neural network that determines the image capturing method (capturing a still image, capturing a moving image, continuous shooting, panoramic image shooting, and so on).

Object Search

Learning for object searches will be described here. In an object search, learning for automatically searching for an object that matches the user's preferences is carried out. As described with reference to the flowchart in FIG. 9, in the object search process (step S904), the object search is carried out by calculating the importance level for each area and then carrying out pan, tilt, and zoom driving. The learning is carried out on the basis of captured images, detection information obtained during the search, and so on, and a result is obtained as a learning result by changing the weighting of the neural network. Various types of detection information are input to the neural network during the search operations, and an object search that reflects the learning is carried out by determining the importance level. In addition to calculating the importance level, the pan/tilt search method (the speed and frequency of movement) is controlled, the object search region is controlled in accordance with the movement speed of the camera, and so on, for example. Furthermore, an optimal object search is carried out by providing a different neural network for each of the above-described camera states and applying a neural network suited to the current camera state.

Object Registration

Learning for object registration will be described here. In object registration, learning for automatically registering and ranking an object according to the user's preference is carried out. For example, facial authentication registration, registration for general physical object recognition, registration for gesture and voice recognition, sound-based scene recognition, and so on are carried out as the learning, for example. Authentication registration is carried out for people and physical objects, and these are then ranked on the basis of a number of times and a frequency at which an image is obtained, a number of times and a frequency at which an image is captured manually, and a frequency with which an object appears in the search. The registered information is registered as inputs for determinations made using the respective neural networks.

Image Capturing Notification Control

Learning for image capturing notifications will be described here. As described with reference to step S910 in FIG. 9, immediately before an image is captured, if a predetermined condition is satisfied, a notification indicating that an image will be captured is provided to the person who will be captured by the camera, and the image is then captured. For example, the object's line of sight may be guided visually through pan/tilt driving operations, or the object's attention may be caught by using a speaker sound emitted by the audio output unit 218, emitting light from an LED by the LED control unit 224, or the like. Whether to use the detection information of the object in the learning is determined on the basis of whether or not the detection information (e.g., the degree of a smile, whether the person is looking at the camera, or gestures) has been obtained immediately after the aforementioned notification, and the training is carried out by changing the weighting in the neural network.

The various pieces of detection information from immediately before the image is captured are input to the neural network, after which a determination as to whether or not to make the notification, determinations pertaining to various operations (sound (sound level/sound type/timing), light (light emission time, speed), camera orientation (pan/tilt motion)), and the like are made.

Low-Power Mode Control

As described with reference to FIGS. 7A, 7B, and 8, control for turning the supply of power to the main CPU (the first control unit 223) on and off is carried out; however, conditions for canceling the low-power mode, conditions for transitioning to the low-power state, and so on are also learned. Learning of the conditions for canceling the low-power mode will be described here.

Tap Detection

As described above, the predetermined time TimeA, the predetermined threshold ThreshA, and the like are changed through learning. Preliminary tap detection is also carried out in a state where the aforementioned threshold for tap detection has been reduced, and the parameters of TimeA, ThreshA, and so on are set to make detection easier depending on whether or not a preliminary tap detection has been determined before a tap has been detected. Additionally, if, after a tap has been detected, it is determined, from the camera detection information, that the tap was not a startup trigger, the parameters of TimeA, ThreshA, and so on are set to make the tap detection more difficult.

Oscillation State Detection

As described above, the predetermined time TimeB, the predetermined threshold ThreshB, the predetermined number CountB, and the like are changed through learning. If the oscillation state determination result corresponds to a startup condition, startup is carried out; however, if, in a predetermined amount of time following the startup, it is determined from the camera detection information that the result was not a startup trigger, learning is carried out to make it more difficult for the startup to occur in response to the oscillation state determination. Additionally, if it is determined that the image capturing frequency is high in a state of high oscillation, the startup is set to be more difficult to occur in response to the oscillation state determination.

Sound Detection

Learning can be carried out by the user manually setting a specific voice, a specific sound scene to be detected, a specific sound level, or the like, through communication using a dedicated application in the external device 301, for example. Additionally, learning can also be carried out by setting a plurality of detection methods in the audio processing unit in advance, causing an image to be learned to be selected through a method described later, learning audio information from before and after included in the image, and setting a sound to be determined as a startup trigger (a specific voice command, and sound scene such as cheering or applause, or the like).

Environment Information Detection

Learning can be carried out by the user manually setting a change in the environment information to be used as a startup condition, through communication using a dedicated application in the external device 301, for example. For example, the startup can be carried out under a specific condition such as an absolute amount or a change amount in a temperature, atmospheric pressure, brightness, humidity, or ultraviolet light amount. Determination thresholds based on the various pieces of environment information can also be learned. If, after the startup carried out in response to the environment information, it is determined, on the basis of the camera detection information, that the environment information was not a startup trigger, the parameters of the various determination thresholds are set to make detecting a change in the environment more difficult.

Additionally, the aforementioned parameters change depending on the remaining battery power. For example, it becomes more difficult to make the various types of determinations when there is less battery power remaining, and becomes easier to make the various types of determinations when there is more battery power remaining. Specifically, there are cases where a determination is made to start up the camera when a high amount of battery power remains, even under oscillation state detection results, sound scene detection results, and the like that are not necessarily triggers for which the user wishes the camera to start up.

Additionally, conditions for canceling the low-power mode can be determined on the basis of a neural network, from information of oscillation detection, sound detection, an elapsed time detection, the various types of environment information, the amount of remaining battery power, and so on. In this case, an image to be learned is selected through a method which will be described later, and the neural network is trained by changing the weighting thereof on the basis of the training information included in the image.

The learning of a condition for transitioning to the low-power state will be described next. As illustrated in FIG. 7A, if the mode setting determination carried out in step S704 indicates that the operating mode is not the automatic image capturing mode, the automatic editing mode, the automatic image transfer mode, the learning mode, nor the automatic file deletion mode, the camera enters the low-power mode. The conditions for determining each mode are as described above, and the conditions under which each mode is determined also change in response to learning.

Automatic Image Capturing Mode

As described above, the importance level is determined for each area, and automatic image capturing is carried out while using pan/tilt to search for an object; however, if it is determined that there is no object to be captured, the automatic image capturing mode is canceled. For example, the automatic image capturing mode is canceled when the importance levels of all of the areas, a value obtained by adding the importance levels of the areas together, or the like has become less than or equal to a predetermined threshold. At this time, the predetermined threshold is also reduced as time passes following the transition to the automatic image capturing mode. It becomes easier to transition to the low-power mode as more time passes following the transition to the automatic image capturing mode.

Low-power mode control that takes battery life into account can be carried out by changing the predetermined threshold in accordance with the remaining battery power. For example, when there is less battery power remaining, the threshold is increased so that it is easier to transition to the low-power mode, whereas when there is more battery power remaining, the threshold is reduced so that it is more difficult to transition to the low-power mode. Here, a parameter for a condition for canceling the low-power mode the next time (an elapsed time threshold TimeC) is set for the second control unit 211 (the sub CPU) in accordance with the amount of time that has passed and the number of images that have been captured since transitioning to the automatic image capturing mode the previous time. The thresholds described above change as a result of learning. The learning is carried out by, for example, manually setting the image capturing frequency, startup frequency, and so on through communication using a dedicated application of the external device 301.

A configuration may be employed in which each parameter is learned by accumulating distribution data for each of average values of the time that passes from when the power button of the camera 101 is turned on to when the power button is turned off, the time periods thereof, and so on. In this case, learning is carried out so that returning from the low-power mode, transitioning to the low-power state, and so on occurs at a shorter time interval for users where the time from the power being turned on to the power being turned off is shorter, and that the stated time interval is longer for users where the time between the power being turned on to the power being turned off is longer.

Learning is also carried out in accordance with the detection information during a search. The learning is carried out so that returning from the low-power mode, transitioning to the low-power state, and so on occurs at a shorter time interval while it is determined that there are many objects which have been set to be important through learning, and the stated time interval is longer while there are fewer important objects.

Image Blur Correction

Learning for image blur correction will be described here. The image blur correction is carried out by calculating a correction amount in step S902 of FIG. 9, and then carrying out pan/tilt driving operations in step S905 on the basis of the correction amount. In the image blur correction, learning is carried out for making corrections in accordance with characteristics of the users oscillations. The direction, magnitude, and so on of blur can be estimated by using, for example, a PSF (Point Spread Function) on the captured image. In the learning information generation carried out in step S912 of FIG. 9, the estimated blur direction and magnitude are added to the image as information.

In the learning mode processing carried out in step S716 of FIG. 7B, the weighting of a neural network for image blur correction is trained using, as an output, the estimated direction and magnitude of the blur, and using, as inputs, the various detection information from when the image was captured (motion vector information of the image from a predetermined amount of time before the image was captured, movement information of a detected object (a person, a physical object, or the like), oscillation information (gyrosensor output, acceleration output, the camera state)). The determination may also be made having added other information to the inputs, namely environment information (temperature, atmospheric pressure, illumination, and humidity), sound information (sound scene determination, specific audio detection, sound level changes), time information (the time that has passed since startup, the time that has passed since the previous image was captured), location information (GPS position information, a position movement change amount), and so on.

When calculating the image blur correction amount in step S902, the magnitude of the blur when an image is captured at that instance can be estimated by inputting the above-described various types of detection information into the neural network. Control for increasing the shutter speed or the like can be carried out when the magnitude of the blur is estimated to be high. Additionally, a method can also be used in which when the magnitude of the blur is estimated to be high, the image will be blurry, and this image capturing is prohibited.

Because there are limits on the pan/tilt driving angles, additional correction cannot be carried out once the end of the driving range is reached; however, the range required by pan/tilt driving for correcting blur in the image being exposed can be estimated by estimating the magnitude and direction of the blur when capturing an image. If there is no leeway in the range of motion during exposure, larger amounts of blur can be suppressed by increasing the cutoff frequency of a filter for calculating the image blur correction amount so that the range of motion is not exceeded. If it seems that the range of motion will be exceeded, starting the exposure after first rotating the pan/tilt angle in the direction opposite from the direction in which the range of motion will be exceeded makes it possible to secure a range of motion and capture an image without blur. Accordingly, image blur correction that conforms to the user's characteristics when capturing an image, how the user uses the camera, and so on can be learned, which make it possible to prevent the captured image from blurring.

Additionally, in the "image capturing method determination" described above, a determination may be made as to whether or not to carry out panning shooting, where a moving object is not blurry but the background, which is stationary, appears to be blurring due to motion. In this case, object blur correction may be carried out by estimating pan/tilt driving speeds for capturing the object without blur from the detection information obtained leading up to the image being captured. At this time, the driving speeds can be estimated by inputting the above-described various types of detection information into an already-trained neural network. The learning is carried out by dividing the image into blocks, estimating a PSF for each block, estimating the direction and magnitude of the blur in the blocks where a main object is located, and then carrying out the learning on the basis of that information.

The amount of blur in the background can also be learned from information of an image selected by the user. In this case, the magnitude of the blur is estimated in a block where the main object is not located, and the user's preferences can be learned on the basis of that information. By setting the shutter speed during image capturing on the basis of the preferred amount of blur in the background which has been learned, image capturing which provides the user's desired panning shooting effect can be carried out automatically.

Learning methods will be described next. "Learning within the camera" and "learning by linking with a communication device" can be given as learning methods.

The method for learning within the camera will be described hereinafter. In the present embodiment, the following methods are given for learning within the camera.
(1) learning from detection information during manual image capturing
(2) learning from detection information when searching for an object Learning from Detection Information during Manual Image Capturing As described with reference to step S907 to step S913 in FIG. 9, in the present embodiment, the camera 101 can capture images in two ways, namely through manual image capturing and automatic image capturing. When a manual image capturing instruction has been made in step S907, information indicating that the image was captured manually is added to the captured image in step S912. If the image has been captured with the automatic image capturing determined to be on in step S909, information indicating that the image was captured automatically is added to the captured image in step S912.

Here, when an image is captured manually, it is highly likely that the image is captured on the basis of the user's preferred object, preferred scene, preferred location, and time interval. Therefore, learning is carried out on the basis of various types of feature data obtained during the manual image capturing, training information of the captured image, and so on. Learning is also carried out with respect to the extraction of a feature amount in the captured image, personal authentication registration, the registration of expressions for each of individuals, the registration of combinations of people, and so on, based on the detection information obtained during the manual image capturing. Additionally, learning is carried out so that the importance of nearby people, physical objects, and the like is changed on the basis of detection information obtained during an object search, e.g., on the basis of the expression of an object registered as an individual. Furthermore, different training data and neural networks may be provided for each of the camera states described above, and additions may be made to the training data coinciding with the state of the camera when the image is captured.

Learning from Detection Information when Searching for an Object

During the object search operations, a determination is made for an object registered for personal authentication, as to which people, physical objects, and scenes that object appears with at the same time, and a time ratio for which the object appears within the angle of view at the same time is calculated. For example, a time ratio for which a person A, which is an object for which personal authentication registration has been carried out, and a person B, which is also an object for which personal authentication registration has been carried out, appear at the same time, is calculated. The various types of detection information are saved as learning data so that a score for determining to capture an image automatically increases when the person A and the person B are within the same angle of view, and learning is then carried out through the learning mode process (step S716).

As another example, a time ratio for which the person A, which is an object for which personal authentication registration has been carried out, appears at the same time as an object "cat", determined through general physical object recognition, is calculated. The various types of detection information are saved as learning data so that a score for determining to capture an image automatically increases when the person A and the cat are within the same angle of view, and learning is then carried out through the learning mode process (step S716).

Additionally, when a high degree of smiling, an expression indicating "joy" or "surprise", or the like has been detected for the person A, which is an object for which personal authentication registration has been carried out, an object appearing at the same time is learned as being important. Alternatively, when an expression indicating "anger", "serious", or the like is detected, an object appearing at the same time is unlikely to be important, and thus the process may be carried out so that no learning is performed.

Learning by linking with an external device according to the present embodiment will be described next. The following methods can be given as methods for learning by linking with an external device according to the present embodiment.
(1) learning by the external device obtaining an image
(2) learning by inputting a determination value for an image through the external device
(3) learning by analyzing an image saved in the external device
(4) learning from information uploaded to an SNS server by the external device
(5) learning by changing camera parameters using the external device (6) learning from information obtained by manually editing an image in the external device Learning by the External Device Obtaining an Image As described with reference to FIG. 3, the camera 101 and the external device 301 have communication means which carry out the first and second communications 302 and 303. Images are primarily sent and received using the first communication 302, and an image within the camera 101 can be sent to the external device 301 through a dedicated application in the external device 301. Additionally, thumbnail images of the image data saved in the camera 101 can be browsed using a dedicated application within the external device 301. The user can select an image he or she likes from the thumbnail images, confirm the image, and issue an instruction to obtain the image, causing the image to be sent to the external device 301.

At this time, the user selects and obtains the image, and thus it is highly likely that the obtained image is an image that matches the user's preferences. The obtained image can therefore be determined to be an image that should be learned, and various types of the user's preferences can be learned by carrying out training on the basis of the training information of the obtained images.

Figure 12:
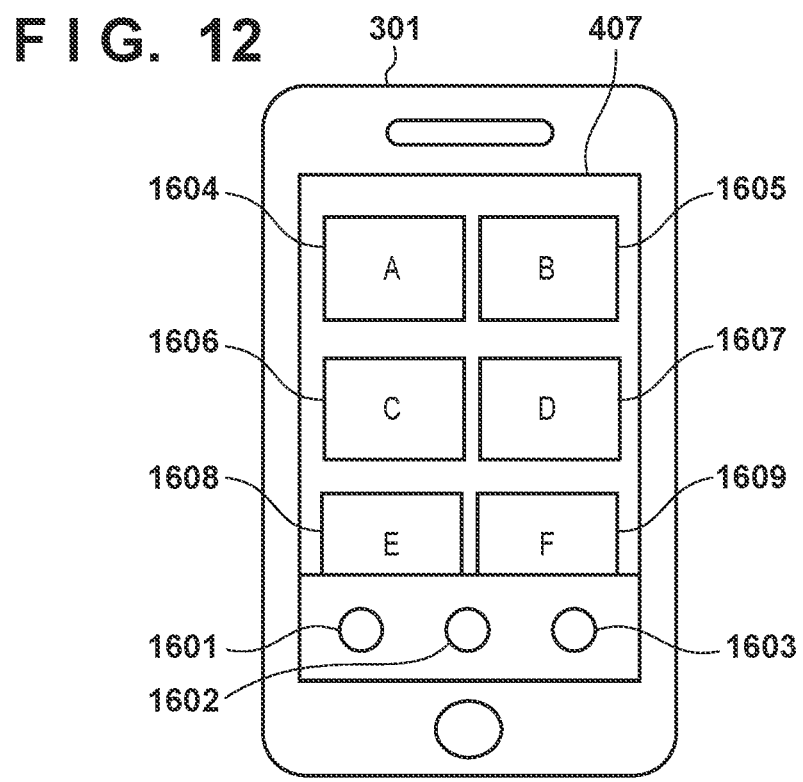
FIG. 12 is a diagram illustrating the browsing of images in an external device.

An example of operations will be described here. FIG. 12 illustrates an example in which images within the camera 101 are being browsed using a dedicated application of the external device 301. Thumbnail images (1604 to 1609) of the image data stored within the camera are displayed in the display unit 407, and the user can select and obtain an image that he or she likes. Buttons 1601, 1602, and 1603, which constitute a display method changing unit for changing the display method, are provided at this time.

When the button 1601 is pressed, the display method changes to a date/time priority display mode, in which the images within the camera 101 are displayed in the display unit 407 in order of the date/time at which they were captured. For example, an image having a newer date/time is displayed at a position indicated by 1604, and an image having an older date/time is displayed at a position indicated by 1609.

When the button 1602 is pressed, the mode changes to a recommended image priority display mode. The images in the camera 101 are displayed in the display unit 407 in order from the image having the highest score, on the basis of the score computed in step S912 of FIG. 9 for determining the user's preferences with respect to each image. For example, an image having a higher score is displayed at a position indicated by 1604, and an image having a lower score is displayed at a position indicated by 1609.

When a button 1603 is pressed, an object such as a person or a physical object can be specified, and when a specific person or physical object is then specified, it is possible to display only the specific object. The buttons 1601 to 1603 can also be turned on simultaneously. For example, when all of the buttons are turned on, only the specified object is displayed, with images captured at a newer date/time being displayed preferentially, and images having a higher score being displayed preferentially. In this manner, the user's preferences are learned for captured images as well, and thus it is possible to extract only images that match the user's preferences from a large amount of captured images by carrying out a simple confirmation task.

Learning by Inputting a Determination Value for an Image Through the External Device As described above, the camera 101 and the external device 301 include communication means, and images stored in the camera 101 can be browsed using a dedicated application within the external device 301. Here, the configuration may be such that the user adds a score to each of the images. The user can add a high score (e.g., 5 points) to an image matching his or her preferences, and add a low score (e.g., 1 point) to an image not matching his or her preferences, and thus the configuration is such that the camera learns in response to user operations. The score for each image is used, along with training information, for retraining within the camera. Learning is carried out so that the output of the neural network, which takes feature data from the specified image information as an input, approaches a score specified by the user.

Although the present embodiment describes a configuration in which the user inputs a determination value for a captured image through the external device 301, the configuration may be such that the determination value is input for the image directly by operating the camera 101. In this case, for example, the camera 101 is provided with a touch panel display, and the mode is set to a mode in which a captured image is displayed when the user presses a GUI button displayed in a screen display part of the touch panel display. The same type of learning can be carried out through a method in which the user inputs a determination value for each captured image while confirming the images.

Learning by Analyzing an Image Saved in the External Device

The external device 301 includes the storage unit 404, and the configuration is such that images aside from images captured by the camera 101 are recorded in the storage unit 404. At this time, it is easy for the user to browse the images stored in the external device 301, and it is also easy to upload the images to a shared server via the public wireless control unit 406, and it is therefore highly likely that many images which match the user's preferences are included.

The control unit 411 of the external device 301 is configured to be capable of using a dedicated application to process images stored in the storage unit 404 with a performance equivalent to that of the learning processing unit 219 in the camera 101. The learning is carried out by communicating the processed training data to the camera 101. Alternatively, the configuration may be such that images, data, and the like to be learned are sent to the camera 101 and the learning is carried out within the camera 101. A configuration is also possible in which the user selects images to be learned from among the image is stored in the recording unit 404 using a dedicated application, and the learning is then carried out.

Learning from Information Uploaded to an SNS Server by the External Device

A method in which information from a social networking service (SNS), which is a service or website in which social networks focusing on connections between people can be constructed, is used in the learning, will be described next. There is a technique in which when an image is uploaded to an SNS, the image is sent from the external device 301 along with tag information which is input with respect to the image. There is also a technique in which likes or dislikes are input with respect to images uploaded by other users, and it is therefore possible to determine whether an image uploaded by another user is one which matches the preferences of the user who owns the external device 301.

Images uploaded by the user him or herself, as well as information pertaining to images as described above, can be obtained through a dedicated SNS application downloaded to the external device 301. Furthermore, images that match the user's preferences, tag information, and the like can also be obtained from the user inputting whether or not he or she likes an image uploaded by another user. By analyzing those images, tag information, and the like, learning can be carried out within the camera 101.

The control unit 411 of the external device 301 is configured to be capable of obtaining images uploaded by the user, images determined to match the user's preferences, and so on as described above, and processing those images with a performance equivalent to that of the learning processing unit 219 within the camera 101. The learning is carried out by communicating the processed training data to the camera 101. Alternatively, the configuration may be such that the images to be learned are sent to the camera 101 and the learning is carried out within the camera 101.

Additionally, object information assumed to match the user's preferences is estimated on the basis of object information set in the tag information (e.g., object information indicating an object such as a dog, a cat, or the like, scene information indicating a beach or the like, expression information indicating a smile or the like, and so on). Learning is then carried out by registering the information as an object to be detected by being input to the neural network.

Additionally, a configuration can be employed in which image information currently popular throughout the world is estimated from statistical values of tag information in the aforementioned SNS (image filter information, object information, and the like), and the learning can then be carried out in the camera 101.

Learning by Changing Camera Parameters Using the External Device

As described above, the camera 101 and the external device 301 have communication means. Learning parameters currently set in the camera 101 (neural network weighting, the selection of objects to be input to the neural network, and so on) can be communicated to the external device 301 and stored in the storage unit 404 of the external device 301. Additionally, learning parameters set in a dedicated server can be obtained via the public wireless control unit 406 using a dedicated application in the external device 301, and can then be set as learning parameters within the camera 101. Accordingly, by storing parameters from a given point in time in the external device 301 and then setting those parameters in the camera 101, the learning parameters can be restored as well. Furthermore, learning parameters held by another user can also be obtained via a dedicated server and set in the user zone camera 101.

Furthermore, the configuration may be such that the dedicated application of the external device 301 can be used for voice commands registered by the user, authentication registration, gesture registration, and the like, or can be used to register an important location. This information is handled as an image capturing trigger, input data for determining automatic image capturing, and so on as described in the automatic image capturing mode processing (FIG. 9). Furthermore, the configuration may be such that an image capturing frequency, startup interval, ratio of still images to moving images, preferred images, and the like can be set, and settings such as for the startup interval, as described in "low-power mode control", are then set.

Learning from Information Obtained by Manually Editing an Image in the External Device The dedicated application in the external device 301 can be provided with a function that enables manual editing through user operations, and the details of the editing task are then fed back into the learning. For example, editing for adding image effects can be carried out (e.g., trimming, rotation, sliding, zooming, fading, color conversion filter effects, time, a still image-to-moving image ratio, BGM).

Then, a neural network for automatic editing is trained so that image effects added through manual editing are determined with respect to training information of an image.

A sequence of the learning processing will be described next. In the mode setting determination made in step S704 FIG. 7A, it is determined whether or not the learning process should be carried out, and if it has been determined that the learning process should be carried out, the learning mode processing of step S716 is carried out.

Conditions for determining the learning mode will be described here. Whether or not to transition to the learning mode is determined on the basis of the amount of time since the previous learning process was carried out, the number of pieces of information that can be used in the learning, whether an instruction to carry out the learning process was made via a communication device, and so on. FIG. 13 illustrates the flow of the process for determining whether or not to transition to the learning mode, the determination being made within the mode setting determination process of step S704.

The sequence illustrated in FIG. 13 starts when an instruction to start the learning mode determination is made within the mode setting determination process of step S704. In step S1401, it is determined whether or not a registration instruction has been made from the external device 301. The determination here is a determination as to whether or not a registration instruction has been made for the above-described learning, e.g., "learning by the external device obtaining an image", "learning by inputting a determination value for an image through the external device", "learning by analyzing an image saved in the external device", or the like.

If a registration instruction has been made from the external device 301 in step S1401, the sequence moves to step S1408, where the learning mode determination is set to "true", the process of step S716 is set to be carried out, and the lear1018840ning mode determination process ends. If there is no registration instruction from the external device in step S1401, the sequence moves to step S1402.

In step S1402, it is determined whether or not a learning instruction has been made from the external device. The determination here is made on the basis of whether or not an instruction for setting learning parameters has been made, e.g., for "learning by changing camera parameters using the external device". If a learning instruction has been made from the external device in step S1402, the sequence moves to step S1408, where the learning mode determination is set to "true", the process of step S716 is set to be carried out, and the learning mode determination process ends. If there is no learning instruction from the external device in step S1402, the sequence moves to step S1403.

In step S1403, an elapsed time TimeN that has passed since the previous learning process (recalculation of the weighting of the neural network) was carried out is obtained, after which the sequence moves to step S1404. In step S1404, a new data number DN for learning (a number of images specified for learning during the elapsed time TimeN that has passed since the previous learning process was carried out) is obtained, after which the sequence moves to step S1405. In step S1405, a threshold DT for determining whether or not to enter the learning mode after the elapsed time TimeN is computed. The configuration is such that it becomes easier to enter the learning mode as the value of the threshold DT decreases. For example, DTa, which is the value of the threshold DT when TimeN is less than a predetermined value, is set to be greater than DTb, which is the value of the threshold DT when TimeN is greater than the predetermined value, and the threshold is set to decrease as time passes. Accordingly, even when there is little training data, it is easier to enter the learning mode when a greater amount of time has passed; and by carrying out the learning again, it is easier for the camera to change through learning in accordance with the usage time.

Once the threshold DT is computed in step S1405, the sequence moves to step S1406, where it is determined whether or not the data number DN for learning is greater than the threshold DT. If the data number DN is greater than the threshold DT, the sequence moves to step S1407, where DN is set to 0. Then, the sequence moves to step S1408, where the learning mode determination is set to "true", the process of step S716 (FIG. 7B) is set to be carried out, and the learning mode determination process ends.

If DN is less than or equal to the threshold DT in step S1406, the sequence moves to step S1409. There has been neither a registration instruction nor a limiting instruction from the external device, and the data number for learning is less than or equal to a predetermined value; as such, the learning mode determination is set to "false", the process of step S716 is set not to be carried out, and the learning mode determination process ends.

Processing carried out in the learning mode processing (step S716) will be described next. FIG. 14 is a flowchart illustrating, in detail, operations carried out in the learning mode processing.

The sequence of FIG. 14 starts when the learning mode is determined in step S715 of FIG. 7B and the sequence moves to step S716. In step S1501, it is determined whether or not a registration instruction has been made from the external device 301. If there is no registration instruction from the external device 301 in step S1501, the sequence moves to step S1502. Various types of registration processes are carried out in step S1502.

The various types of registrations are registrations of features to be input to a neural network, e.g., facial authentication registration, general physical object recognition registration, sound information registration, location information registration, and the like. Once the registration processes end, the sequence moves to step S1503, and the elements to be input to the neural network are changed on the basis of the information registered in step S1502. Once the process of step S1503 ends, the sequence moves to step S1507.

If there has been no registration instruction from the external device 301 in step S1501, the sequence moves to step S1504, where it is determined whether or not a learning instruction has been made from the external device 301. If there has been a learning instruction from the external device 301, the sequence moves to step S1505, where the learning parameters communicated from the external device 301 are set in various determiners (neural network weighting and the like), after which the sequence moves to step S1507.

If there is no learning instruction from the external device 301 in step S1504, learning (recalculating the neural network weighting) is carried out in step S1506. The process of step S1506 is carried out when the data number DN for learning exceeds the threshold DT and the respective determiners are to be retrained, as described with reference to FIG. 13. The retraining is carried out through a method such as error back propagation, gradient descent, or the like, the weighting of the neural network is recalculated, and the parameters of the respective determiners are changed. Once the learning parameters are set, the sequence moves to step S1507.

In step S1507, the image within the file is re-scored. In the present embodiment, the configuration is such that a score is given to all captured images stored in a file (the recording medium 221) on the basis of learning results, and automatic editing, automatic file deletion, and the like are carried out in accordance with the scores that have been given. Accordingly, if retraining has been carried out, or learning parameters from the external device have been set, it is necessary to update the scores for captured images as well. Thus in step S1507, re-calculation is carried out to give new scores to the captured images stored in the file, and once that process ends, the learning mode processing ends as well.

The present embodiment describes a configuration in which learning is carried out within the camera 101. However, the same learning effects can be realized even with a configuration that provides a learning function in the external device 301, and learning is carried out only on the external device side by communicating the data necessary for learning to the external device 301. In this case, the configuration may be such that learning is carried out by setting parameters, such as neural network weighting, learned on the external device side in the camera 101 through communication, as described above in "learning by changing camera parameters using the external device".

Additionally, the configuration may be such that both the camera 101 and the external device 301 are provided with learning functions; e.g., the configuration may be such that the training information held by the external device 301 is communicated to the camera 101 at the timing at which the learning mode processing (step S716) is carried out within the camera 101, and learning is carried out by merging the learning parameters.

Second Embodiment

The configuration of a camera according to a second embodiment is the same as in the first embodiment; as such, only the parts different from those in the first embodiment will be described hereinafter, and configurations of processes that are the same will not be described.

In the present embodiment, a type of an attachment attached to the camera 101 can be detected by an attachment detection unit (not shown). For example, a method is used in which a non-contact communication means or the like is used to send information of the type of the attachment which is attached, from attachments 1501 to 1504 illustrated in FIGS. 15A to 15D, to the camera 101. It is also possible to send and receive information, and carry out the detection, using connectors provided in the camera 101 and the attachments 1501 to 1504. However, if the camera 101 includes a battery, there are cases where it is not necessary to provide a battery connector in the attachment. In this case, purposefully providing a connector will make it necessary to also include components such as for adding a waterproofing function to the connection part, which increases the size, the cost, and so on of the device. Using a non-contact communication means or the like is therefore preferable. Bluetooth Low Energy (BLE), near field communication (NFC) BLE, or the like may be used as the non-contact communication means, or another method may be used instead.

Additionally, a radio wave emission source in the attachments 1501 to 1504 may be compact, with a low-capacity power source; for example, a button battery, a means that generates a very small amount of power from a force used to press an operating member (not shown), or the like may be used.

By detecting the type of the attachment, the state of the camera can be determined in a limited manner in accordance with the type of the attachment (e.g., whether the camera is in a handheld state, hung from the neck, in a wearable state, placed on a desk, attached to a moving body, or the like, i.e., the state information). The attachment can be detected as being attached using an existing method, such as detecting a change in voltage, detecting an ID, or the like.

Figure 15A:
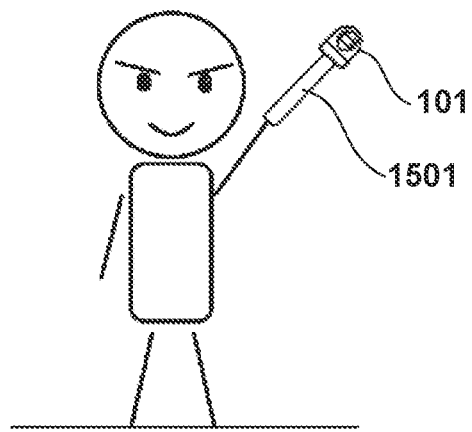
FIG. 15A is a diagram illustrating an example of attaching an attachment.
Figure 15B:
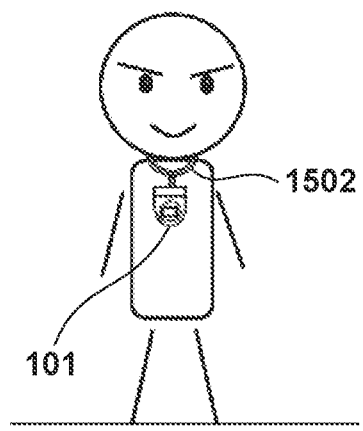
FIG. 15B is a diagram illustrating an example of attaching an attachment.
Figure 15C:
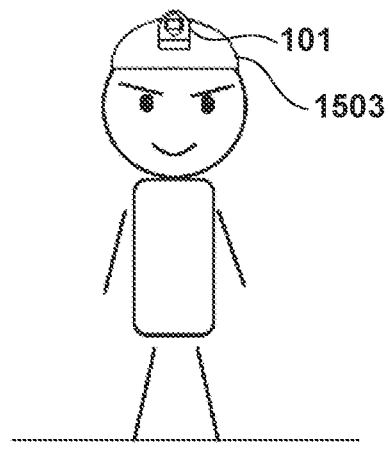
FIG. 15C is a diagram illustrating an example of attaching an attachment.
Figure 15D:
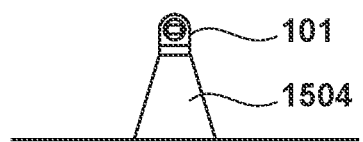
FIG. 15D is a diagram illustrating an example of attaching an attachment.

FIGS. 15A to 15D are diagrams illustrating usage examples when an attachment is attached. FIG. 15A illustrates the handheld state, FIG. 15B illustrates the camera hung from the neck, FIG. 15C illustrates a wearable state, and FIG. 15D illustrates a stationary placement state; here, respective attachments are attached to the camera 101. 1501 indicates a handheld attachment; 1502 indicates an attachment for hanging from the neck; 1503 indicates a wearable attachment; and 1504 indicates an attachment for stationary placement. Instead of a head-mounted form, it is also conceivable for the wearable attachment 1503 to be attached to one's shoulder, belt, or the like.

When an attachment is attached in this manner, there are cases where the state of the camera is limited, which increases how accurately the camera state can be determined; this in turn makes it possible to more appropriately control the timing of automatic image capturing, the object search range, the timing at which the low-power mode is turned on and off, and so on.

Furthermore, the state of the camera may be further limited by combining a camera state determination made using the type of the attachment with object information, camera movement information, an oscillation state, and so on. For example, when a handheld attachment has been detected, the object search range control, automatic image capturing control, and low-power mode control are changed depending on whether the user is walking or is at rest in the handheld state. Likewise, when a stationary placement attachment has been detected, whether the camera is at rest on a desk or is attached to a vehicle, a drone, or the like and is moving is determined from the movement information, the oscillation state, and the like, and the various types of control are changed.

Specifically, FIG. 18 illustrates a summary of examples of the object search range, the automatic image capturing control, and the low-power mode control for each type of attachment.

Figure 16A:
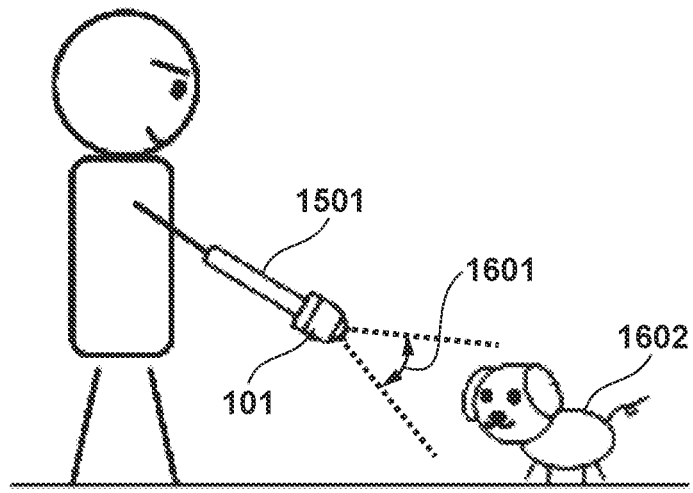
FIG. 16A is a diagram illustrating an object search range when attaching a handheld attachment.
Figure 16B:
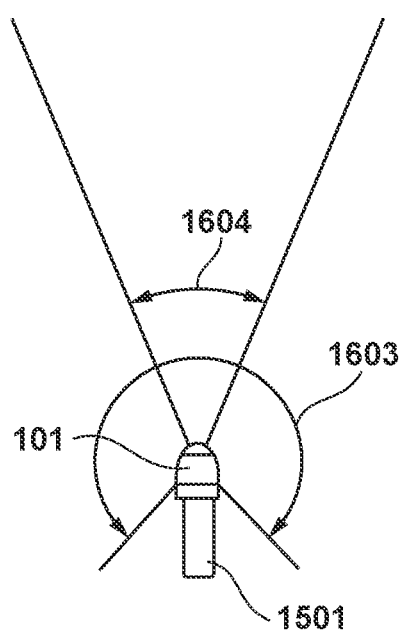
FIG. 16B is a diagram illustrating an object search range when attaching a handheld attachment.

First, when the handheld attachment 1501 is attached as illustrated in FIG. 15A, is considered highly likely that the user is pointing the camera at a given object, as illustrated in FIG. 16A. Accordingly, an object 1602 can be found even if an object search range 1601 is set to a narrow range. FIG. 16B is a diagram illustrating only the camera 101 attached to the handheld attachment 1501. The object search range can be set to a region such as an object search range 1604, which is narrow relative to a capturable range 1603. In the automatic image capturing carried out in this case, the user is intentionally pointing the camera at an object, and thus the frequency of image capturing may be increased (an image capturing frequency determination), and the image capturing direction may be limited to the direction in which the camera is facing. Additionally, because images are to be captured while the camera is being pointed at the object, it is not necessary to set the camera to the low-power mode. This example is one in which an object is present in the direction in which the camera is facing, and thus when such is not the case, it is not necessary to narrow the object search range, increase the image capturing frequency, or the like.

Next, when an attachment 1502 for hanging from the neck is attached as illustrated in FIG. 15B, the object search range may be limited to a range that avoids showing the user's body to the greatest extent possible, as indicated by 1322 in FIGS. 10A to 10E. When the camera is hung from the neck, it is conceivable that the camera is being used as a lifelogging camera, and thus the image capturing frequency may be set to a constant interval, and the forward direction may be prioritized as the image capturing direction. However, the configuration may be such that changes in the surrounding environment and so on are detected in response to the user's movement, voice, or the like, the image capturing frequency is increased, and the limit on the image capturing direction is eliminated, so that more images can be recorded when an event occurs. Additionally, once a predetermined number of images of the same scene have been captured, the camera may be transitioned to the low-power mode until a trigger such as the user making a large movement is detected, in order to avoid capturing many similar photographs.

When the wearable attachment 1503 is attached as illustrated in FIG. 15C, the control may be changed significantly in accordance with the usage application. With a head-mounted attachment such as that illustrated in FIG. 15C, control similar to that applied when using the attachment for hanging from the neck may be carried out in situations where the user is hiking, mountain climbing, or the like. Alternatively, when a technician is using the camera to record his or her work, the object search may be carried out so that the technician's hands are shown to the greatest extent possible, and control may be carried out for recording with an increased image capturing frequency.

Figure 17A:
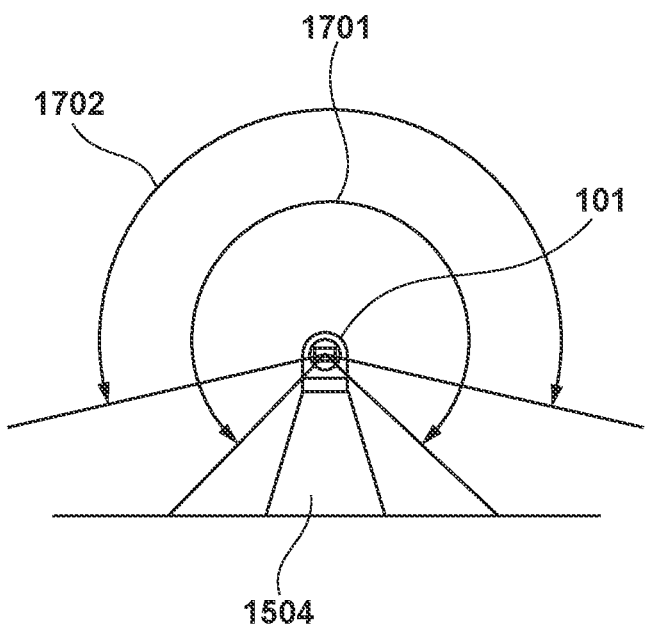
FIG. 17A is a diagram illustrating an object search range when attaching a desktop attachment.
Figure 17B:
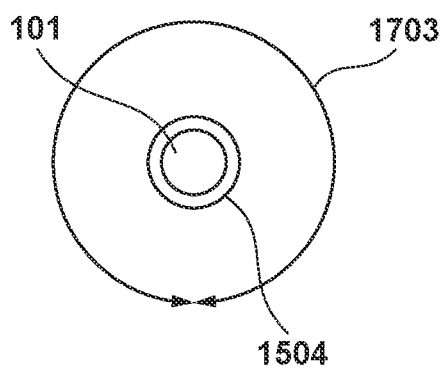
FIG. 17B is a diagram illustrating an object search range when attaching a desktop attachment.

A situation where the attachment 1504 for stationary placement is attached as illustrated in FIG. 15D will be described using FIGS. 17A and 17B. FIG. 17A illustrates a situation where the camera 101 is placed on a desk using the attachment 1504 for stationary placement, directly from the side. The object search range may be narrowed slightly, as indicated by 1702, relative to a capturable range 1701, so that the desk (ground surface, floor) does not occupy a significant part of the image. Likewise, FIG. 17B is a diagram illustrating a state in which the camera is viewed from above. In this state, there are no particular obstructions in the periphery, and thus an object search range 1703 applies to all directions. Because the camera does not move at this time, in the automatic image capturing control, the image capturing frequency may be reduced each time an image is captured to avoid capturing similar photographs, and then increased once a new person, a change in the environment, or the like has been detected. The image capturing direction is set to cover all directions as well, so as to avoid capturing similar photographs. Furthermore, the camera may be transitioned to the low-power mode once a predetermined number of images have been captured.

Furthermore, when the camera is attached to a moving body using the attachment for stationary placement, it is assumed that the camera will be moving toward the object that has been captured; thus the object search may be carried out preferentially in the forward direction, and the image capturing direction may also be preferentially set to the forward direction. In this case, the image capturing frequency is changed in accordance with the movement of the moving body. For example, if the travel direction changes frequently, the image capturing frequency is increased. However, if the travel direction does not change, and the speed also does not change greatly, control may be carried out to transition to the low-power mode at set intervals.

In this manner, using attachment information makes it possible to limit the camera state determination, which in turn makes it possible to determine the state more accurately. The object search control, automatic image capturing control, and low-power mode control can therefore be carried out more accurately, which increases the likelihood that the user can capture an image according to his or her expectations.

Examples of embodiments of the present invention will be described hereinafter.

Embodiment 1

An image capturing apparatus, characterized by comprising: image capturing means for capturing an object image; object detection means for detecting an object from image data captured by the image capturing means; state detection means for detecting information pertaining to a state of movement of the image capturing apparatus itself; and control means for controlling a range in which the object detection means searches for an object, on the basis of state information of the image capturing apparatus detected by the state detection means.

Embodiment 2

The image capturing apparatus according to Embodiment 1, characterized in that the state detection means detects a travel direction and a movement speed of the image capturing apparatus.

Embodiment 3

The image capturing apparatus according to Embodiment 1 or 2, characterized in that the state detection means detects the travel direction and the movement speed of the image capturing apparatus on the basis of at least one of angular velocity information, acceleration information, GPS position information, and a motion vector calculated for each of coordinates from a captured image, of the image capturing apparatus.

Embodiment 4

The image capturing apparatus according to Embodiment 3, characterized in that the state detection means detects the travel direction and the movement speed of the image capturing apparatus on the basis of a measurement result in a set period.

Embodiment 5

The image capturing apparatus according to any one of Embodiments 1 to 4, characterized in that the object detection means changes a time interval of searching for an object on the basis of a detection result from the state detection means.

Embodiment 6

The image capturing apparatus according to any one of Embodiments 1 to 5, characterized in that the control means makes a range in which to search for an object narrower as the movement speed of the image capturing apparatus detected by the state detection means increases.

Embodiment 7

The image capturing apparatus according to any one of Embodiments 1 to 6, characterized in that the control means makes the range in which to search for an object broader when it has been determined, by the detection carried out by the state detection means, that the image capturing apparatus is at rest, than when the image capturing apparatus is moving.

Embodiment 8

An image capturing apparatus, characterized by comprising: image capturing means for capturing an object image; object detection means for detecting an object from image data captured by the image capturing means; state detection means for detecting information pertaining to a state in which the image capturing apparatus is being held; and control means for controlling a range in which the object detection means searches for an object, on the basis of state information of the image capturing apparatus detected by the state detection means.

Embodiment 9

The image capturing apparatus according to Embodiment 8, characterized in that the state in which the image capturing apparatus is being held includes at least one of a handheld state, being hung from a neck, a wearable state, being placed on a desk, and being placed on a moving body.

Embodiment 10

The image capturing apparatus according to any one of Embodiments 1 to 9, characterized in that the control means sets a range to search for an object to an angular range that is horizontally symmetrical with respect to a travel direction of the image capturing apparatus.

Embodiment 11

The image capturing apparatus according to Embodiment 1 or 8, characterized in that the state detection means detects information of an attachment attached to the image capturing apparatus, and the control means controls the range in which the object detection means searches for an object in accordance with the information of the attached attachment.

Embodiment 12

The image capturing apparatus according to Embodiment 8, characterized in that when the state in which the image capturing apparatus is being held is hanging from a neck, the control means limits the range in which the object detection means searches for an object so that a user's body is not visible.

Embodiment 13

The image capturing apparatus according to any one of Embodiments 1 to 12, characterized by further comprising: changing means for changing an orientation of the image capturing means so that the image capturing means faces in the direction of an object.

Embodiment 14

The image capturing apparatus according to Embodiment 13, characterized in that the changing means causes the image capturing means to rotate in a pan direction or a tilt direction.

Embodiment 15

The image capturing apparatus according to Embodiment 13 or 14, characterized in that the range for searching for an object is a range in which the changing means changes the orientation of the image capturing means.

Embodiment 16

The image capturing apparatus according to any one of Embodiments 1 to 15, characterized in that a different neural network is provided for each state of the image capturing apparatus, and a neural network suited to the state of the image capturing apparatus is applied.

Embodiment 17

The image capturing apparatus according to any one of Embodiments 1 to 16, characterized by further comprising: image capturing frequency determination means for determining an image capturing frequency of the automatic image capturing means, wherein the image capturing frequency is determined on the basis of the state information of the image capturing apparatus.

Embodiment 18

The image capturing apparatus according to any one of Embodiments 1 to 17, characterized by further comprising: low-power mode control means, wherein low-power mode control is carried out on the basis of the state information of the image capturing apparatus.

Embodiment 19

The image capturing apparatus according to any one of Embodiments 1 to 18, characterized by further comprising: automatic image capturing means for causing the image capturing means to capture an image on the basis of information of the object detected by the object detection means, and recording captured image data.

Embodiment 20

A method of controlling an image capturing apparatus, the image capturing apparatus including image capturing means for capturing an object image, and the method characterized by comprising: an object detection step of detecting an object from image data captured by the image capturing means; a state detection step of detecting information pertaining to a state of movement of the image capturing apparatus itself; and a control step of controlling a range in which an object is searched for in the object detection step, on the basis of state information of the image capturing apparatus detected in the state detection step.

Embodiment 21

A method of controlling an image capturing apparatus, the image capturing apparatus including image capturing means for capturing an object image, and the method characterized by comprising: an object detection step of detecting an object from image data captured by the image capturing means; a state detection step of detecting information pertaining to a state in which the image capturing apparatus is being held; and a control step of controlling a range in which an object is searched for in the object detection step, on the basis of state information of the image capturing apparatus detected in the state detection step.

Embodiment 22

A program that causes a computer to execute the steps of the control method according to Embodiment 20 or 21.

Embodiment 23

A computer-readable storage medium in which is stored a program for causing a computer to execute the steps of the control method according to Embodiment 20 or 21.

According to the present invention, meaningless searching for an object can be eliminated, and the probability that an image the user likes can be obtained can be increased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. An image capturing apparatus, comprising:
an image capturing device configured to capture an object image;
a platform;
a rotation mechanism configured to rotate the image capturing device with respect to the platform;
at least one processor or circuit configured to function as:
an object detection unit configured to detect an object from image data captured by the image capturing device, a state detection unit configured to detect information pertaining to a moving state of the image capturing apparatus, and a control unit configured to control the rotation mechanism to perform an automatic rotation driving in which the image capturing device is automatically rotated in at least one of a pan direction and a tilt direction, wherein the control unit controls a time interval between the timings of performing the automatic rotation driving, on the basis of state information of the image capturing apparatus detected by the state detection unit.

2. The image capturing apparatus according to claim 1, wherein the state detection unit detects information pertaining to a moving speed of the image capturing apparatus as the information pertaining to the moving state of the image capturing apparatus, and the control unit controls the time interval to perform the automatic rotation driving on the basis of information pertaining to the moving speed of the image capturing apparatus.

3. The image capturing apparatus according to claim 2, wherein the control unit shortens the time interval to perform the automatic rotation driving in a case where the state detection unit detects that the image capturing apparatus moves at a first speed than in a case where the state detection unit detects that the image capturing apparatus moves at a second speed that is lower than the first speed.

4. The image capturing apparatus according to claim 1, wherein the automatic rotation driving is performed to automatically search an object.

5. The image capturing apparatus according to claim 1, wherein the state detection unit detects the information pertaining to the moving state of the image capturing apparatus based on at least one of angular velocity information, acceleration information, GPS position information of the image capturing apparatus and a motion vector calculated for each coordinate from a captured image.

6. The image capturing apparatus according to claim 5, wherein the state detection unit detects a moving direction and a moving speed based on detection results during a constant time interval.

7. The image capturing apparatus according to claim 1, wherein the state detection unit further detects information pertaining to a state in which the image capturing apparatus is installed, and the control unit controls the time interval to perform the automatic rotation driving based on the information pertaining to the moving state of the image capturing apparatus and the information pertaining to a state in which the image capturing apparatus is installed.

8. The image capturing apparatus according to claim 7, wherein the state in which the image capturing apparatus is installed includes at least one of a handheld state, being hung from a neck, a wearable state, being placed on a desk, and being placed on a moving body.

9. The image capturing apparatus according to claim 1, wherein the state detection unit further detects information pertaining to a state in which the image capturing apparatus is installed, and the control unit controls a range in which the object detection unit searches for an object by controlling a range in which the orientation of the image capturing device is changed based on the information pertaining to the state in which the image capturing apparatus is installed.

10. The image capturing apparatus according to claim 9, wherein when the state in which the image capturing apparatus is installed is hanging from a neck, the control unit limits the range in which the object detection unit searches for an object so that a user's body is not visible.

11. The image capturing apparatus according to claim 1, wherein a different neural network is provided for each state of the image capturing apparatus.

12. The image capturing apparatus according to claim 1, wherein the control unit controls a range in which the object detection unit searches for an object by controlling a range in which the orientation of the image capturing device is changed based on the information pertaining to the moving state of the image capturing apparatus.

13. The image capturing apparatus according to claim 1, wherein the state detection unit detects information pertaining to a moving speed of the image capturing apparatus as the information pertaining to the moving state of the image capturing apparatus, and the control unit controls the range in which the object detection unit searches for an object based on the information pertaining to the moving speed.

14. The image capturing apparatus according to claim 13, wherein the control unit makes narrower the range in which the object detection unit searches for an object in a case where the state detection unit detects that the image capturing apparatus moves at a third speed than in a case where the state detection unit detects that the image capturing apparatus moves at a fourth speed that is lower than the third speed.

15. The image capturing apparatus according to claim 13, wherein the control unit makes wider the range in which the object detection unit searches for an object in a case where the state detection unit detects that the image capturing apparatus is still than in a case where the state detection unit detects that the image capturing apparatus moves.

16. The image capturing apparatus according to claim 1, wherein the state detection unit detects information pertaining to a moving direction of the image capturing apparatus, and the control unit controls a range in which the object detection unit searches for an object based on the information pertaining to the moving direction.

17. The image capturing apparatus according to claim 1, wherein the at least one processor or circuit is configured to further function as an automatic image capturing unit configured to make the image capturing device to perform image capturing based on information of the object detected by the object detection unit and record the captured image data.

18. The image capturing apparatus according to claim 17, wherein the at least one processor or circuit is configured to further function as an image capturing frequency determination unit configured to determine an image capturing frequency of the automatic image capturing unit,
wherein the image capturing frequency is determined on the basis of the state information of the image capturing apparatus.

19. The image capturing apparatus according to claim 17, wherein the automatic image capturing unit controls to automatically carry out the image capturing operation using parameters generated by a machine learning.

20. The image capturing apparatus according to claim 19, wherein the image capturing operation is changed by updating the parameters based on the machine learning using data output by the image capturing device.

21. The image capturing apparatus according to claim 1, wherein the at least one processor or circuit is configured to further function as a low-power mode control unit,
wherein low-power mode control is carried out on the basis of the state information of the image capturing apparatus.

22. A method of controlling an image capturing apparatus, the image capturing apparatus including image capturing device configured to capture an object image, a platform, and a rotation mechanism configured to rotate the image capturing device with respect to the platform, the method comprising:
- detecting an object from image data captured by the image capturing device;
- detecting information pertaining to a moving state of the image capturing apparatus; and
- controlling the rotation mechanism to perform an automatic rotation driving in which the image capturing device is automatically rotated in at least one of a pan direction and a tilt direction,
- wherein in the controlling, a time interval between the timings of performing the automatic rotation driving is controlled on the basis of state information of the image capturing apparatus detected in the detecting of the information.

23. A non-transitory computer-readable storage medium in which is stored a program for causing a computer to execute a method of controlling an image capturing apparatus, the image capturing apparatus including image capturing device configured to capture an object image, a platform, and a rotation mechanism configured to rotate the image capturing device with respect to the platform, the method comprising:
- detecting an object from image data captured by the image capturing device;
- detecting information pertaining to a moving state of the image capturing apparatus; and
- controlling the rotation mechanism to perform an automatic rotation driving in which the image capturing device is automatically rotated in at least one of a pan direction and a tilt direction,
- wherein in the controlling, a time interval between the timings of performing the automatic rotation driving is controlled on the basis of state information of the image capturing apparatus detected in the detecting of the information.

* * * * *